United States Patent
Ruehl et al.

(10) Patent No.: US 10,515,177 B1
(45) Date of Patent: Dec. 24, 2019

(54) METHOD, SYSTEM, AND COMPUTER PROGRAM PRODUCT FOR IMPLEMENTING ROUTING AWARE PLACEMENT OR FLOOR PLANNING FOR AN ELECTRONIC DESIGN

(71) Applicant: Cadence Design Systems, Inc., San Jose, CA (US)

(72) Inventors: Roland Ruehl, San Carlos, CA (US); Henry Yu, Palo Alto, CA (US); Joshua Alexander Baudhuin, Portland, OR (US)

(73) Assignee: Cadence Design Systems, Inc., San Jose, CA (US)

( * ) Notice: Subject to any disclaimer, the term of this patent is extended or adjusted under 35 U.S.C. 154(b) by 206 days.

(21) Appl. No.: 15/638,247

(22) Filed: Jun. 29, 2017

(51) Int. Cl.
*G06F 17/50* (2006.01)

(52) U.S. Cl.
CPC .......... *G06F 17/5077* (2013.01); *G06F 17/50* (2013.01); *G06F 17/5036* (2013.01); *G06F 17/5072* (2013.01); *G06F 17/5081* (2013.01); *G06F 17/509* (2013.01); *G06F 17/5045* (2013.01); *G06F 17/5068* (2013.01); *G06F 2217/06* (2013.01)

(58) Field of Classification Search
CPC ............. G06F 17/5072; G06F 17/5077; G06F 17/5068; G06F 17/505; G06F 17/5081; G06F 2217/08; G06F 2217/12; G03F 1/70; G03F 7/70433
USPC ................. 716/102–104, 118–119, 112, 126, 716/129–130, 132–135, 139
See application file for complete search history.

(56) References Cited

U.S. PATENT DOCUMENTS

| | | | |
|---|---|---|---|
| 6,209,123 B1 | 3/2001 | Maziasz | |
| 6,298,468 B1 * | 10/2001 | Zhen | G06F 17/5072 716/122 |
| 6,370,673 B1 | 4/2002 | Hill | |
| 6,557,153 B1 | 4/2003 | Dahl | |
| 6,823,501 B1 | 11/2004 | Dahl | |
| 7,266,796 B1 | 9/2007 | Chu | |
| 7,937,682 B2 | 5/2011 | Arunachalam | |
| 8,448,117 B2 | 5/2013 | Dai | |
| 8,595,662 B1 * | 11/2013 | Yu | G06F 17/5068 716/110 |
| 8,788,998 B2 | 7/2014 | Hatamian | |
| 9,213,793 B1 * | 12/2015 | Salowe | G06F 17/5077 |
| 9,465,908 B2 | 10/2016 | Bischoff | |
| 9,690,896 B2 | 6/2017 | Seo | |

(Continued)

OTHER PUBLICATIONS

U.S. Appl. No. 15/396,156, filed Dec. 30, 2016.

(Continued)

*Primary Examiner* — Nghia M Doan
(74) *Attorney, Agent, or Firm* — Vista IP Law Group, LLP

(57) ABSTRACT

Disclosed are techniques for implementing routing aware floorplanning or placement for an electronic design. These techniques preprocess an electronic design and a plurality of inputs for a floorplanner or placer, identify a tentative location for inserting a block comprising one or more pins into a floorplan or placement layout, snap the block to a legal location based at least in part upon one or more characteristics of the one or more pins or one or more pseudo-pins, and update the floorplan or placement layout with one or more geometric routes based in part or in whole upon the legal location.

20 Claims, 22 Drawing Sheets

(56) References Cited

U.S. PATENT DOCUMENTS

| | | | |
|---|---|---|---|
| 9,727,685 | B2 | 8/2017 | Yuan |
| 2005/0198605 | A1 | 9/2005 | Knol |
| 2006/0225017 | A1* | 10/2006 | Uchida ............... G06F 17/5081 716/112 |
| 2007/0245281 | A1 | 10/2007 | Riepe |
| 2007/0283306 | A1 | 12/2007 | Koefferlein |
| 2009/0199142 | A1 | 8/2009 | Arunachalam |
| 2009/0271753 | A1 | 10/2009 | Quandt |
| 2009/0307640 | A1 | 12/2009 | Chapman |
| 2010/0070942 | A1 | 3/2010 | Madurawe |
| 2010/0125822 | A1* | 5/2010 | Lepere ............... G06F 17/5068 716/119 |
| 2012/0241986 | A1 | 9/2012 | Sherlekar |
| 2013/0042217 | A1 | 2/2013 | Heng |
| 2013/0104093 | A1 | 4/2013 | Huang |
| 2014/0289695 | A1 | 9/2014 | Yoshida |
| 2014/0331198 | A1 | 11/2014 | Bischoff |
| 2015/0067616 | A1 | 3/2015 | Hsu |
| 2017/0032073 | A1 | 2/2017 | Chen |
| 2018/0144082 | A1 | 5/2018 | Hanchinal |

OTHER PUBLICATIONS

U.S. Appl. No. 15/396,178, filed Dec. 30, 2016.
U.S. Appl. No. 15/396,229, filed Dec. 30, 2016.
U.S. Appl. No. 15/396,205, filed Dec. 30, 2016.
U.S. Appl. No. 15/476,921, filed Mar. 31, 2017.
Kahng, Andrew B., et al. VLSI physical design: from graph partitioning to timing closure. Springer Science & Business Media, 2011.

* cited by examiner

METHOD, SYSTEM, AND COMPUTER PROGRAM PRODUCT FOR IMPLEMENTING ROUTING AWARE PLACEMENT OR FLOOR PLANNING FOR AN ELECTRONIC DESIGN

CROSS REFERENCE TO RELATED APPLICATIONS

This application is related to U.S. patent application Ser. No. 15/396,156, entitled "METHOD, SYSTEM, AND COMPUTER PROGRAM PRODUCT FOR IMPLEMENTING GROUP LEGAL PLACEMENT ON ROWS AND GRIDS FOR AN ELECTRONIC DESIGN" filed on Dec. 30, 2016, U.S. patent application Ser. No. 15/396,178, entitled "METHOD, SYSTEM, AND COMPUTER PROGRAM PRODUCT FOR IMPLEMENTING GROUP LEGAL PLACEMENT ON ROWS AND GRIDS FOR AN ELECTRONIC DESIGN" filed on Dec. 30, 2016, U.S. patent application Ser. No. 15/396,229, entitled "METHOD, SYSTEM, AND COMPUTER PROGRAM PRODUCT TO IMPLEMENT SNAPPING FOR AN ELECTRONIC DESIGN" filed on Dec. 30, 2106, U.S. patent application Ser. No. 15/396,205, entitled "METHOD, SYSTEM, AND COMPUTER PROGRAM PRODUCT FOR IMPLEMENTING LEGAL PLACEMENT WITH CONTEXTUAL AWARENESS FOR AN ELECTRONIC DESIGN" filed on Dec. 30, 2016, and U.S. patent application Ser. No. 15/476,921, entitled "METHOD, SYSTEM, AND COMPUTER PROGRAM PRODUCT FOR IMPLEMENTING ROUTING AWARE PLACEMENT OR FLOORPLANNING FOR AN ELECTRONIC DESIGN" filed on Mar. 31, 2017. This application is also related to U.S. patent application Ser. No. 13/602,071, entitled "METHODS, SYSTEMS, AND ARTICLES OF MANUFACTURE FOR ROUTING AN ELECTRONIC DESIGN USING SPACETILES" filed on Aug. 31, 2012, U.S. patent application Ser. No. 13/602,069, entitled "METHODS, SYSTEMS, AND ARTICLES OF MANUFACTURE FOR ROUTING AN ELECTRONIC DESIGN USING SPACETILES" filed on Aug. 31, 2012, U.S. patent application Ser. No. 13/931,689, entitled "METHODS, SYSTEMS, AND ARTICLES OF MANUFACTURE FOR ASSOCIATING TRACK PATTERNS WITH RULES FOR ELECTRONIC DESIGNS" filed on Jun. 28, 2013, U.S. patent application Ser. No. 13/931,627, entitled "METHODS, SYSTEMS, AND ARTICLES OF MANUFACTURE FOR ASSIGNING TRACK PATTERNS TO REGIONS OF AN ELECTRONIC DESIGN" filed on Jun. 28, 2013, U.S. patent application Ser. No. 13/931,503, entitled "METHODS, SYSTEMS, AND ARTICLES OF MANUFACTURE FOR IMPLEMENTING A PHYSICAL ELECTRONIC DESIGN WITH AREA-BOUNDED TRACKS" filed on Jun. 28, 2013, U.S. patent application Ser. No. 13/931,707, entitled "METHODS, SYSTEMS, AND ARTICLES OF MANUFACTURE FOR AUTOMATICALLY ASSIGNING TRACK PATTERNS TO REGIONS FOR PHYSICAL IMPLEMENTATION OF AN ELECTRONIC DESIGN" filed on Jun. 28, 2013, U.S. patent application Ser. No. 13/931,568, entitled "METHODS, SYSTEMS, AND ARTICLES OF MANUFACTURE FOR INTERACTIVELY IMPLEMENTING PHYSICAL ELECTRONIC DESIGNS WITH TRACK PATTERNS" filed on Jun. 28, 2013, U.S. patent application Ser. No. 14/044,836, entitled "METHODS, SYSTEMS, AND ARTICLES OF MANUFACTURE FOR IMPLEMENTING ELECTRONIC DESIGNS USING FLEXIBLE ROUTING TRACKS" filed on Oct. 2, 2013, U.S. patent application Ser. No. 14/292,067, entitled "METHOD, SYSTEM, AND COMPUTER PROGRAM PRODUCT FOR IMPLEMENTING TRACK PATTERNS FOR ELECTRONIC CIRCUIT DESIGNS" filed on May 30, 2014, U.S. patent application Ser. No. 14/292,122, entitled "METHOD, SYSTEM, AND COMPUTER PROGRAM PRODUCT FOR IMPLEMENTING REPETITIVE TRACK PATTERNS FOR ELECTRONIC CIRCUIT DESIGNS" filed on May 30, 2014, and U.S. patent application Ser. No. 14/292,166, entitled "METHOD, SYSTEM, AND COMPUTER PROGRAM PRODUCT FOR INTERCONNECTING CIRCUIT COMPONENTS WITH TRACK PATTERNS FOR ELECTRONIC CIRCUIT DESIGNS" filed on May 30, 2014. The contents of the aforementioned U.S. patent applications are hereby incorporated by reference in their respective entireties for all purposes.

BACKGROUND

Physical implementation flow of a modern electronic design often starts with the floorplanning or placement stage at which various instances, blocks, cells, etc. are inserted into a layout canvas of the electronic design according to various criteria or rules governing the floorplan or the placement layout. This floorplan or placement layout may then be forwarded to a router to perform, for example, global and detailed routing to complete the physical design. Conventional floorplanners or placement tools are merely concerned with the floorplanning or placement rules and constraints but are not aware of the routing or routability requirements, rules, or constraints or do not have sufficient knowledge therefor and thus may cause various issues or errors during the subsequent routing stage. Some errors may even require a portion of a layout be ripped up and rerouted in order to address certain violations (e.g., design rule violations, etc.) and hence consume unnecessary computational resources and delays the development cycle and thus the time to market.

For example, when inserting a block, a cell (e.g., an intellectual property or IP cell, a parameterized or non-parameterized cell, a custom cell, etc.), or a macro (collectively block hereinafter) into a layer of a floorplan or a placement layout, conventional floorplanner or placement tools merely consider the design rules, constraints, and/or requirements pertaining to the floorplan or placement layout. Some conventional approaches do not or even cannot consider any design rules, constraints, and/or requirements about routing, while some other conventional approaches attempt to address this deficiency by anticipating routability through heuristics without concrete data (e.g., by merely considering global routes, flight lines, etc. that at best indicate the approximate direction of the eventual detail routes without providing any useful electrical and/or geometric information of such eventual detail routes. As a result, there is a greater probability that the resulting floorplan or placement may include some regions that may not provide optimal routing solution or may not even be routable. Some conventional approaches attempt to address this shortcoming by considering some rudimentary information (e.g., metal density distribution estimates, congestion estimates, etc.) during floorplanning or placement while hoping that such rudimentary information would somewhat reduce the burden of the routing engine.

Although these conventional floorplanning or placement approaches may alleviate the workload of the router, these conventional approaches nevertheless fall short due to the imprecise estimates. The advent of advanced nodes further exacerbates the problem with these conventional approaches. For example, when inserting a block, a cell (e.g., an intellectual property or IP cell, a parameterized or non-parameterized cell, a custom cell, etc.), or a macro (collectively block hereinafter) into a layer of a floorplan or a placement layout, conventional floorplanner or placement tools merely consider the design rules, constraints, and/or requirements pertaining to the layer into which the block is to be inserted yet often fail to account for design rules, constraints, and/or requirements pertaining to neighboring layers. With the advanced technology nodes that permit only one routing direction for each layer, these conventional approaches often cause routability issues. As a result, routing a modern electronic designs or routability of an electronic design may be severely affected by the placement of devices in the electronic design.

Another challenge that modern electronic designs often face is caused by the more stringent performance, manufacturing, and/or reliability requirements such as the low power requirements, various electromagnetic interference requirements, intersymbol interference requirements, yield requirements, etc. Modern electronic design flows often check these requirements during the post-route analysis or optimization stage; and failure to meet any of these requirements may result in expensive fixes.

Therefore, there is a need for implementing routing aware placement for an electronic design to address at least the aforementioned shortfalls of conventional approaches.

SUMMARY

Disclosed are method(s), system(s), and article(s) of manufacture for implementing routing aware placement for an electronic design in various embodiments.

Some embodiments are directed to a method for implementing routing aware placement for an electronic design. Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

More details of various aspects of the methods, systems, or articles of manufacture for implementing placement using row templates for an electronic design using row templates are described below with reference to FIGS. 1-8B.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments are directed to a method, system, and computer program product for implementing routing-aware floorplanning or placement for electronic designs. Other objects, features, and advantages of the invention are described in the detailed description, figures, and claims.

Various embodiments generate or update a floorplan or a placement layout by inserting or manipulating (e.g., translating, rotating, and/or mirroring) one or more blocks or pins (e.g., input/output or I/O pins) in the floorplan or placement layout. While a block is being manipulated in the floorplan or placement layout, the floorplanner or placer determines free design space and tile the free design space into one or more free spacetiles dynamically or on the fly. One or more switchbox routing problems may be constructed using at least these one or more spacetiles dynamically or on the fly and may be solved sequentially or in parallel. The floorplanner or placer may further issue a function call to invoke a fast router that generates geometric routes for at least the block when the block is being manipulated. The floorplanner or placer is thus made aware of the actual, geometric routes while performing the intended functions as designed. The floorplanner or placer may incrementally update the floorplan or the placement layout within the context of the geometric routes as additional blocks are inserted into the floorplan or placement layout.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1A:
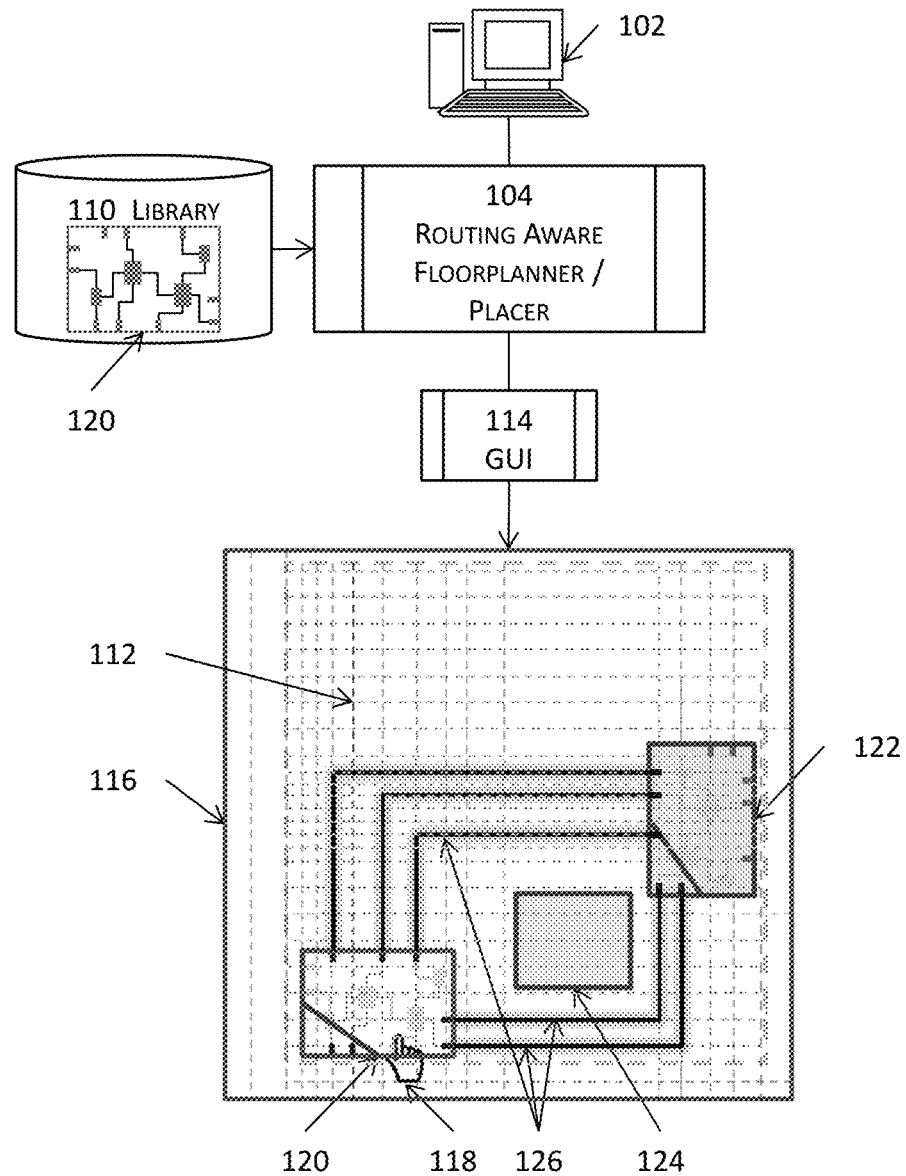
FIGS. 1A-1B illustrate high level block diagrams for implementing routing aware placement for an electronic design in one or more embodiments.
Figure 1B:
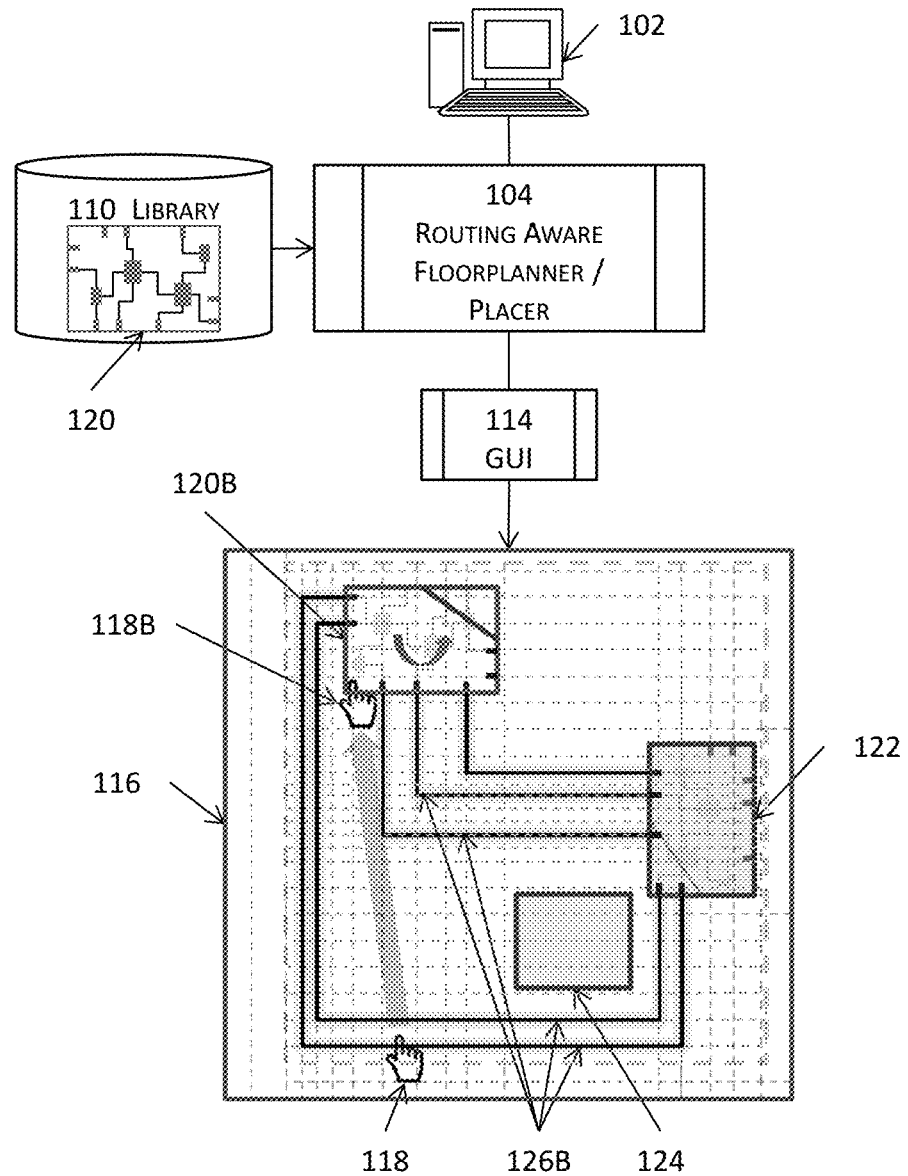

FIGS. 1A-1B illustrate high level block diagrams for implementing routing aware placement for an electronic design in one or more embodiments. In the example illustrated in FIG. 1A, a block 120 may be selected from a library 110 and inserted into a region 116 in a floorplan or placement layout. This block 120 may be inserted via automatic floorplanning or placement in some embodiments or via interactive or assisted floorplanning or placement through a graphical user interface (GUI) 114 of a computing system 102 in some other embodiments. In these embodiments, a routing-aware floorplanner or a routing-aware placement tool 104 may be invoked to perform this floorplanning or placement task. In this example, the region in the floorplan or placement layout already contains two blocks 122 and 124 as shown in FIG. 1A.

In an example of assisted or interactive floorplanning or placement, a user may select the block 120 from the library 110 and either drag or move the cursor 118 of the point device to a tentative location in the region of the floorplan or placement layout. The routing-aware floorplanner or a routing-aware placement tool 104 (depending on whether a floorplanning or placement task is at hand) may examine the vicinity of the tentative location, determines a legal location for the block, and snap the block at the determined legal location with or without the user's approval or confirmation.

In addition to snapping the block to the determined legal location, the routing-aware floorplanner or a routing-aware placement tool 104 may further invoke a fast routing engine (not shown) to determine geometric routes 126 between this block 120 and one or more existing blocks (e.g., 122 and/or 124). These geometric routes 126 may be generated and either temporarily stored in a volatile memory (e.g., one or more blocks of random access memory) in some embodiments or persistently stored in a non-volatile storage device in some other embodiments.

In some embodiments, these geometric routes 126 may include the actual wire or interconnect designs with a full set of geometric details (e.g., length, width, etc.) rather than or instead of global routes, non-topological routes, flight lines or orthogonal versions thereof, or other non-geometric routes that are merely used as a guide for a routing engine that subsequently determines geometric routes but are never materialized in the eventual layout of the electronic design or manufactured as a part of the actual electronic design.

The example region 116 illustrated in FIG. 1A also shows a plurality horizontal and vertical tracks 112. It shall be noted that although FIGS. 1A-1B show both a horizontal set and a vertical set of routing tracks, these two sets of routing tracks may or may not exist on the same layer (e.g., a metal layer). In some embodiments where a layer is allowed to have two routing directions (e.g., horizontal and vertical routing directions), this layer is then associated with both the horizontal set and the vertical set of routing tracks.

In some other embodiments where a layer is allowed to have only one routing direction, this layer may be associated with, for example, a horizontal set of routing tracks; and an adjacent layer may then be associated with a vertical set of routing tracks. In these embodiments, no bends are allowed for interconnects on a single layer. Rather, a via may be inserted along an interconnect on a first layer having a routing direction so as to continue to route the interconnect in an orthogonal routing direction. Therefore, although these geometric routes 126 are graphically illustrated as wire segments with bends, these bends may represent the locations of vias in some embodiments where only one routing direction is permitted for a layer.

FIG. 1B illustrates the example where the user drags the block 120 from the cursor position 118 to the new cursor position 118B. In some embodiments, the routing-aware floorplanner or a routing-aware placement tool 104 may sample the positions of the cursor 118 at a sampling rate while the user is dragging the cursor 118 to capture the positions of the cursors according to the sampling rate. For the ease of illustration and description, it may be assumed that FIG. 1B illustrates the scenario where the routing-aware floorplanner or a routing-aware placement tool 104 determines that the user intends to drop the block 120 in the area near the cursor position 118B.

The routing-aware floorplanner or a routing-aware placement tool 104 may analyze the space near the cursor position 118B and determines a legal location 120B for the block such that the block, when placed at the legal location 120B, complies with the design rules, constraints, and/or requirements. For example, the routing-aware floorplanner or a routing-aware placement tool 104 may examine the track patterns of the pins and/or interconnects within the block 120 and identifies the legal location 120B that corresponds to a legal set of routing tracks along which the pins and/or interconnects of block 120 may be placed to satisfy the track pattern requirements, design rules, or constraints. Based on the identified legal set of routing tracks, the routing-aware floorplanner or a routing-aware placement tool 104 may translate, rotate, or mirror the original block 120 into a translated, rotated, or mirrored block so that the translated, rotated, or mirrored block satisfies all the design rules, requirements, or constraints for track patterns when placed at the legal location 120B as illustrated in FIG. 1B.

As in FIG. 1B, the routing-aware floorplanner or a routing-aware placement tool 104 may also dynamically generate geometric routes 126B to interconnect the translated, mirrored, or rotated block at the new legal location 120B with one or more existing blocks (e.g., block 122 in FIG. 1B). These geometric routes 126B, like the routes 126 in FIG. 1A, may be generated on the fly or dynamically as the block 120 is being moved. Conventional routers require a lot more computations and much longer time and thus cannot generate geometric routes because these conventional routers take much longer time to generate geometric routes.

Moreover, although these geometric routes are generated on the fly or dynamically as one or more blocks are being moved in a floorplan or placement layout during the floorplanning or placement stage, these geometric routes may be identical to or at least substantially similar to the geometric routes that are generated by conventional routers, depending on the range of influence that is accounted for during the floorplanning or placement of one or more moving blocks. A smaller range of influence may correspond to a set of geometric routes that is less likely to be optimized, whereas a larger range of influence may correspond to a set of geometric routes that is more likely to be optimized in some embodiments.

As a result, these geometric routes generated on the fly or dynamically at the floorplanning or placement stage may be as good as the geometric routes generated during the routing stage that occurs after the floorplanning or placement stage and may be subject to the same, for example, post-route optimization that may adjust or modify some but not necessarily all of such geometric routes. In this manner, the workload of the router and thus computational resource utilization may be greatly reduced because these geometric routes not only present what a routed portion of the electronic design may appear when one or more blocks of electronic circuit designs are inserted into the floorplan or placement layout but also at least graphically represent what the detailed, geometric routes may appear in the floorplan or placement.

Furthermore, although these geometric routes may be generated and stored in a temporary memory block, these geometric may also be persistently stored in, for example, a layout design database in a storage device. The routers that may be used to generate these geometric routes on the fly or dynamically for one or more moving blocks during the floorplanning or placement stage are described in the related U.S. patent applications in the first paragraph entitled Cross Reference to Related Applications and will not be repeated herein.

Moreover, due to the effectiveness and efficiencies of these routers that generate geometric routes on the fly or dynamically during the floorplanning or placement stage, the routing-aware floorplanner or a routing-aware placement tool 104 may further adjust generated geometric routes while the floorplan or the placement layout is continuously being populated with additional blocks of electronic design circuit components so that the geometric routes being adjusted or modified due to the insertion of additional electronic design circuit components or removal of existing electronic design circuit components may be reflected in the GUI.

In some embodiments, the routing-aware floorplanner or a routing-aware placement tool 104 may be functioning in tandem with a router to flag a portion of the electronic design of interest in which routability is reduced below a threshold limit so that the routing-aware floorplanner or a routing-aware placement tool 104 may adjust the corresponding locations of one or more blocks for the router to generate a set of legal geometric routes.

Figure 2:
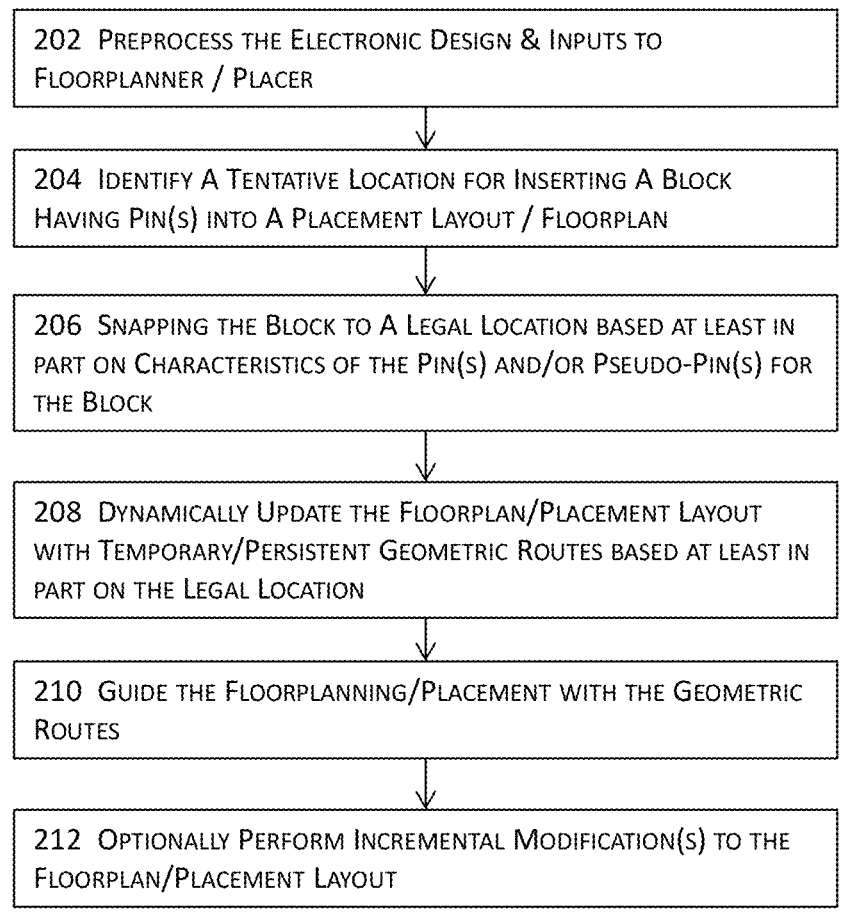
FIG. 2 illustrates a high level flow diagram for implementing routing aware placement for an electronic design in one or more embodiments.

FIG. 2 illustrates a high level flow diagram for implementing routing aware placement for an electronic design in one or more embodiments. In these embodiments, the electronic design of interest and the inputs for the routing-aware floorplanner or a routing-aware placement tool 104 may be preprocessed at 202. For example, a portion of a floorplan or placement layout may be identified; any existing blocks (e.g., intellectual property cells, macros, blockages, etc.) of electronic design components in the portion may be identified; the portion of the floorplan or placement layout may be processed to generate free design space (e.g., free spacetiles described below) for a router to implement the geometric routes. More details about preprocessing the electronic design and the inputs are described below with reference to FIGS. 3A-3G.

With the inputs and the electronic design of interest preprocessed at 202, a tentative location for inserting a block having one or more pins into a floorplan or a placement layout of the electronic design may be identified at 204. As previously described, a block may be inserted into the floorplan or the placement layout via automatic, interactive, or assisted floorplanning or placement. In automatic floorplanning or placement, a routing-aware floorplanner or a routing-aware placement tool (e.g., 104 in FIGS. 1A-1B) may automatically identify a legal location for the block by accounting for various governing design rules, constraints, and/or requirements.

For example, certain integrated circuit designs may require that all pins, wires, and interconnects satisfy the corresponding track requirements. In this example, the routing-aware floorplanner or a routing-aware placement tool may identify one or more characteristics such as the width values, spacing, orientations, or locations, etc. of the one or more pins in the block and identify a set of routing tracks that are associated with corresponding width values and the spacing requirements for the block so that the block, when placed at this legal location, satisfies the requirements associated with the set of routing tracks. In an interactive or assisted floorplanning or placement task, a user may approximately determine the whereabouts of a block in the floorplan or placement layout by pointing at or around a desired location or the vicinity of the desired location with a point device, and the routing-aware floorplanner or a routing-aware placement tool may capture the location of the pointing device cursor as the tentative location.

A tentative location may also be identified at 204 in a plurality of different ways. For example, a tentative location for a block may be identified by capturing the position of the cursor when the cursor remains or hovers in the vicinity of a specific position in the graphical user interface in some embodiments. A tentative location may also be identified in numerous other manners in some other embodiments. For example, in addition to or in the alternative of capturing the position around which the cursor hovers as the tentative location for a block, the routing-aware floorplanner or a routing-aware placement tool may sample the cursor positions at a predetermined sampling rate (e.g., a sampling rate of 50 milliseconds per sample) and capture one or more additional positions along the trajectory of the cursor of a pointing device with which a user drags the block into the floorplan or placement layout.

In some these embodiments, the routing-aware floorplanner or a routing-aware placement tool may further adjust the sampling rate based on the speed at which the cursor of the pointing device is moved. For example, the routing-aware floorplanner or a routing-aware placement tool may also consider the speed of and/or direction in which the cursor is moving in the graphical user interface.

In some of these embodiments, the routing-aware floorplanner or a routing-aware placement tool may further look forward into the design space in the direction of motion of the cursor and analyze the design space to predict whether the design space into which the cursor may move corresponds to any viable tentative locations. In these embodiments, the routing-aware floorplanner or a routing-aware placement tool may be configured to possess the forward-tracking capability to analyze the design space into which the block may be dragged The routing-aware floorplanner or a routing-aware placement tool may identify at least one tentative location from these one or more tentative locations, examine a sampling space around the at least one tentative location to identify a legal location for the block, and snap the block to the legal location at 206. In some embodiments, the routing-aware floorplanner or a routing-aware placement tool determines a legal location for each of the captured or non-skipped tentative locations. By capturing these tentative locations along or near the trajectory of the cursor and determining the corresponding legal positions, the routing-aware floorplanner or a routing-aware placement tool is thus configured to possess backward-tracking capability that may be used to determine, at least locally in the area under consideration, an optimal legal location at which the block may be inserted at least in the sampling space examined by the routing-aware floorplanner or a routing-aware placement tool.

With the one or more legal locations determined at 206, the floorplan or the placement layout may be dynamically updated with temporary or persistent geometric routes for at least one legal location of the one or more legal locations at 208. These geometric routes may be generated by invoking a router described herein with a function call. Due to the effectiveness and efficiency of the routers described herein, these geometric routes may be generated dynamically or on the fly as the block being moved in the floorplan or placement layout. The geometric routes generated at 208 may be stored temporarily in a block of volatile memory in some embodiments, whereas these geometric routes may also be persistently stored in some other embodiments.

These geometric routes generated at 208 may be used to guide the floorplanning and/or placement of one or more existing blocks or pins (e.g., I/O pins) and/or one or more new, additional blocks or pins into the corresponding floorplan or placement layout at 210. For example, because these geometric routes may be generated in such a way to be electrically and/or geometrically proximate or even identical version of the corresponding final detail routes or even the corresponding detail routes after post-route optimizations, electrical characteristics such as resistances may be computed for these geometric routes 126 with much higher accuracy (e.g., than global routes, flight lines, etc.) Pertinent electrical constraints, design rules, or requirements may be applied to the electrical characteristics to constrain, restrict, or guide the floorplanning or placement.

For example, when a block is inserted into a floorplan or placement layout, these techniques described herein may generate a resulting geometric route connecting the block to, for example, another block or pin. Because this geometric route is electrically and/or geometrically proximate the actual, detail route, the resistance value of this geometric route may be computed. If the resistance value of this geometric route is determined to be sufficiently close to the maximum permissible resistance value as permitted by an electrical requirement, these techniques described herein may thus further account for this electrical requirement in light of the resistance value of the geometric route and may thus further constrain or restrict the positioning of the block that may result in increase in the length of the geometric route.

Incremental modifications may be performed at 212 to the floorplan or the placement layout. The floorplan or the placement layout may be incrementally modified as a new block is inserted into the floorplan or placement layout by moving one or more existing blocks and/or altering one or more existing geometric routes in view of the new block. As described above, the geometric routes generated at 208 may be stored temporarily in a block of volatile memory in some embodiments, whereas these geometric routes may also be persistently stored in some other embodiments. Either way, these geometric routes may be made available for subsequent reuse (e.g., subsequent modifications).

For example, a first block may be subsequently adjusted or modified after one or more additional blocks have been populated into the floorplan or placement layout since the insertion of the first block. These one or more additional blocks may render the previously determined legal location for the first block less optimal than one or more other previously determined legal locations in some embodiments. In these embodiments, the first block may be moved to another legal location in the floorplan or placement layout; and the corresponding set of geometric routes may be resurrected without further computation by the router, although the net saving of the computational resources at the router is offset by the additional memory needed to store the corresponding set of geometric routes. In some other embodiments, the routing-aware floorplanner or a routing-aware placement tool and the router may re-compute a new set of geometric routes for a block every time when the block is moved in the floorplan or placement layout. The latter approach conserves the memory footprint that will be otherwise occupied by the corresponding set of geometric routes had the corresponding set of geometric routes been saved. This net saving in the memory utilization is nevertheless offset by the re-computation of the geometric routes.

In some embodiments, a sliding scale approach may be adopted to strike a balance between the conservation of memory and the conservation of processor cycles for the re-computation of the geometric routes. For example, a threshold number of legal locations may be determined for a block where legal locations corresponding to routability scores below a threshold limit may be discarded. In addition or in the alternative, a threshold number of sets of geometric routes may be determined for each block so that not all legal locations determined for the block correspond to the same number of sets of geometric routes.

Figure 3A:
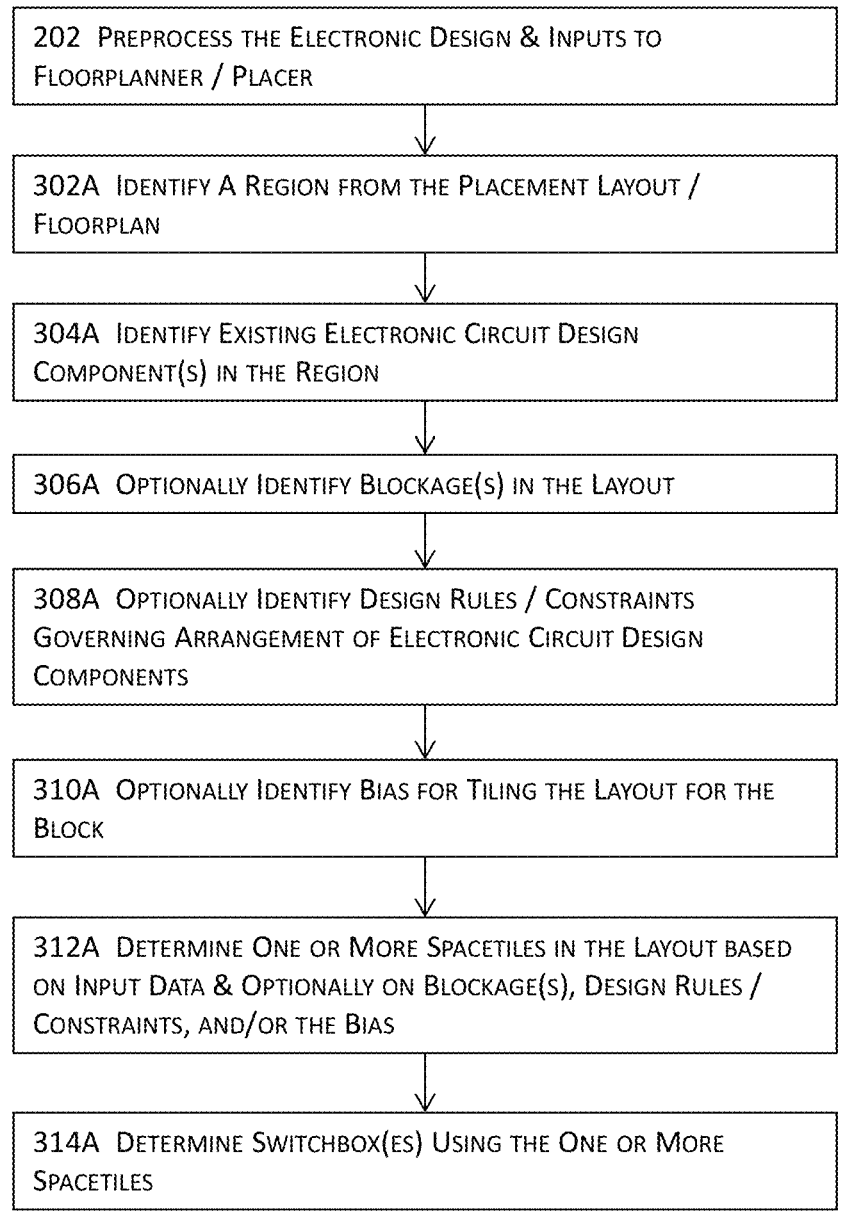
FIG. 3A illustrates a more detailed flow diagram about a part of the high level flow diagram illustrated in FIG. 2 in some embodiments.

FIG. 3A illustrates a more detailed flow diagram about a part of the high level flow diagram illustrated in FIG. 2 in some embodiments. More specifically, FIG. 3A illustrates more details about preprocessing an electronic design and the inputs. In some embodiments, a region may be identified at 302A from the floorplan or placement layout. For example, in an electronic design that is subject to track pattern requirements, a region in the electronic design that corresponds to more track patterns and provides more or the most flexibility for floorplanning, placement, and/or routing may be identified at 302A.

A track pattern includes a set of routing tracks; and a routing track is merely an imaginary or fictitious line or line segment that is derived from the manufacturing grids provided by foundries. A routing track thus has no thickness although a routing track may be associated with a thickness value with which a shape (e.g., a wire, an interconnect, etc.) implemented along the routing track needs to comply. The set of routing tracks in a track pattern is not random combinations of routing tracks. Rather, the routing tracks in a track pattern are to comply with the design rules governing permissible arrangement of width values corresponding to these routing tracks.

For example, modern electronic design fabrication does not allow the freedom of having wires with arbitrary widths.

Instead, modern electronic design fabrication of a technology node may allow only the width values of, for example, {32 nm, 34 nm, 38 nm, 46 nm, 58 nm, 62 nm, 70 nm, 76 nm, 78 nm, 86 nm} for wires in electronic designs. More critically, modern electronic design fabrication also does not allow wires having arbitrary combinations of width values for shapes immediately adjacent to one another. Rather, a wire of a certain width value can only be situated right next to a smaller set of width values. In the aforementioned example, a wire having a 32 nm width may only be situated to wires having width of 32 nm, 34 nm, 38 nm, 46 nm, and 58 nm but not wires having 62 nm or wider width values.

Although some electronic designs may include the same set of track patterns throughout the entire designs, a floorplan or placement layout may sometimes include different portions each of which is assigned or associated with a different set of track patterns. In these latter embodiments, a region that provide more or the most flexibility (e.g., flexibility of routing wires of more width values) may be identified at 302A.

Existing electronic circuit design components in the region may be identified at 304A. Blockages may also be optionally identified at 306A. Although both occupy physical space in the floorplan or placement layout, an existing electronic circuit design component may be distinguishable from a blockage in that an existing electronic circuit design component may be interconnected with one or more existing electronic circuit design components, whereas a blockage may not be interconnected. In some embodiments where track pattern rules governing permissible (or legal) arrangements of routing tracks or the shapes implemented thereupon, the pertinent design rules, constraints, or requirements governing the legal arrangements of routing tracks may be identified at 308A. It shall be note that various embodiments described herein apply to electronic designs regardless of whether such track pattern design rules, constraints, or requirements are imposed.

The region identified at 302A may be further tiled or partitioned into a plurality of smaller regions or spacetiles (hereinafter spacetile for singular or spacetiles for plural). A bias may be optionally identified or determined at 310A for tiling the design space. The bias may be used to determine the preferred direction of such partitioning or tiling. For example, a bias in favor of the horizontal routing direction may result in increasing or maximizing the horizontal span of partitioning a free space in a floorplan or placement layout, whereas a bias in favor of the vertical routing direction may result in increasing or maximizing the vertical span of partitioning a free space in a floorplan or placement layout.

One or more spacetiles may be determined at 312A based at least in part upon the input data and optionally upon the blockages identified at 306A and/or the optional bias identified at 310A for tiling the design space. A spacetile comprises an n-dimensional geometric entity in the routing space in some embodiments. For example, a spacetile may comprise a geometric object associated with a two-dimensional geometric space or a degenerated zero-dimensional (e.g., a point) or one-dimensional (e.g., a line or a line segment) geometric entity. A spacetile may be used to define an area probe that may be used to guide a router (e.g., a point-to-point router that routes an interconnect between two points in the design) to perform a search (e.g., an area search, a line search, etc.) for the identification of routes in an electronic design. A probe may also be used to store information such as the information about the spacetile itself, various information about routing interconnects (e.g., destination location, source location, etc.), or other information pertinent to routes in some embodiments.

One or more switchbox routing problems may be determined at 314A by using at least the one or more spacetiles determined at 312A. A switchbox routing problem includes a design space (e.g., a rectangular design space) that may have connections on all sides (e.g., all four sides of the rectangular design space) of the design space. A switchbox routing problem is distinguishable from a channel routing problem that includes a design space (e.g., a rectangular design space) that may have connections on two opposing sides but not the other sides of the design space.

In some embodiments where a spacetile is determined to correspond to an edge on which one or more actual pins are located, these one or more actual pins are mapped to the corresponding switchbox routing problem to provide the source and/or destination locations of one or more geometric routes interconnecting these one or more actual pins. In some other embodiments where a geometric route does not start or end along the boundaries of a spacetile but merely passes through the spacetile, the corresponding switchbox routing problem may be generated by adding a pseudo-pin along the boundaries where the geometric route may enter or exit the spacetile so that the corresponding switchbox routing problem includes a source location and a destination for the geometric route that the corresponding switchbox routing problem is devised to determine.

In some embodiments, each spacetile that one or more geometric routes may at least partially occupy some space therein may be formulated as a switchbox routing problem. In some embodiments where geometric routes touch upon a plurality of spacetiles, a plurality of switchbox routing problems may be generated at 312A. The plurality of switchbox routing problems may be processed sequentially in some embodiments or in parallel in some other embodiments where each switchbox problem is formulated to be independent of the other switchbox problems.

Depending upon the objective or purpose of the geometric routes generated during the floorplanning or placement stage, these switchbox problems may be solved with a balance between allocation of computational resources and accuracy of the solutions to the switchbox problems. For example, if the objective is to generate a floorplan or placement layout for concept and feasibility study, less computational resources may be allocated in solving the switchbox problems.

As another example, if the objective is to generate a floorplan or placement layout that better accommodates electrical characteristics or behavior of the eventual detail routes than the geometric resemblance between the geometric routes and the eventual detail routes, a first geometric route segment determined from solving a first switchbox problem may be permitted to be disconnected (e.g., short) from the second geometric route segment, which is supposed to be connected to the first geometric route segment, determined from solving a second switchbox problem, without further investing additional computational resources in connecting the first and second geometric route segments. In this example, although the first and second geometric route segments are disconnected, their combined electrical characteristics (e.g., resistance value) may nevertheless be sufficiently satisfactory (e.g., the overall length is sufficiently close to that of the detail route despite the short) to accurately predict or model the electrical behavior of the underlying electronic circuit.

On the other hand, if the objective is to generate geometric routes that are as close to the eventual detail route, additional computational resources may be allocated to iteratively solving for the first and second switchbox problems until the overall geometric route including both the first and the second geometric route segments are sufficiently similar to or identical to the final, eventual detail route.

In some embodiments, geometric routes generated during the floorplanning or placement stage provide more detailed insight into the routability of the electronic design during the placement design than a simple yes or no answer provided by conventional approaches that consider routability during placement or floorplanning, not to mention other conventional approaches that do not even account for routability during placement or floorplanning. For example, geometric routes and hence their corresponding electrical characteristics may provide better congestion analysis by, for example, indicating how many or what kind of routing tracks may be needed to produce a routable design, what spacing value between two blocks may be needed for a routable design, etc.

More accurate parasitics may also be computed for these geometric routes generated with the techniques described herein because these geometric routes are much more accurate than, for example, global routes, flight lines, etc. These parasitics may be propagated backward to the schematic to perform schematic simulation or re-simulation to predict the electrical behavior of the electronic design as well as whether the electronic design conforms to the electrical requirements even when the layout of the electronic design is partial or incomplete.

In addition or in the alternative, these geometric routes may be generated substantially similar to or even identical to the final detail routes, metal density or its distribution of the electronic design or a portion thereof may be more accurately predicted even during the floorplanning or placement stage. These advantages of the techniques described herein thus render the floorplanner or the placement engine aware of the routing requirements, electrical requirements, timing requirements, as well as other electrical, functional, manufacturing, and/or reliability requirements during the floorplanning or placement stage even before the layout is partially routed.

Figure 3B:
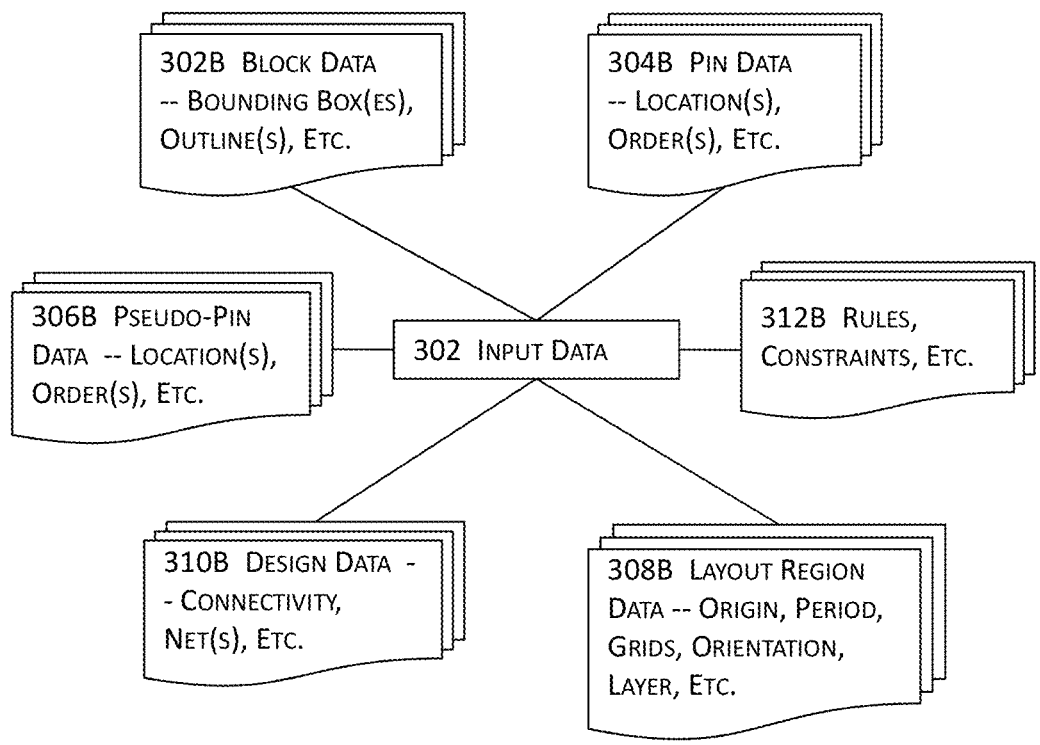
FIG. 3B illustrates some examples of input data processed in the high level flow diagram illustrated in FIG. 2 in some embodiments.

FIG. 3B illustrates some examples of input data processed in the high level flow diagram illustrated in FIG. 2 in some embodiments. In these examples, the input data from the preprocessing at 302 may include, for example, data about a block 302B such as the bounding box or outline of the block, the bounding box of the block plus an offset, the origin of the block, the orientation of the block, track patterns or routing tracks defined or required within the block, width values of wires and interconnects within the block, layer information, etc.

The input may also include pin data of one or more actual pins 304B and/or pseudo-pins 306B such as the order of actual and/or pseudo-pins along an edge of a block, the absolute or relative locations of actual and/or pseudo-pins along an edge of a block, etc. Data 308B about the layout region may also be included in the input data; and such layout region data may include the origin of the region, the period of a track pattern, the grids, track pattern(s), and/or routing tracks associated with the layout region, etc.

Design data 310B such as connectivity, schematic netlists (the physical netlists have not been generated during the floorplanning or placement stage), etc. may also be a part of the input data. In addition or in the alternative, the input data from the preprocessing at 302 may also include governing design rules, constraints, and/or requirements (312B) pertaining to the floorplanning, placement, and/or routing tasks in the region.

Figure 3C:
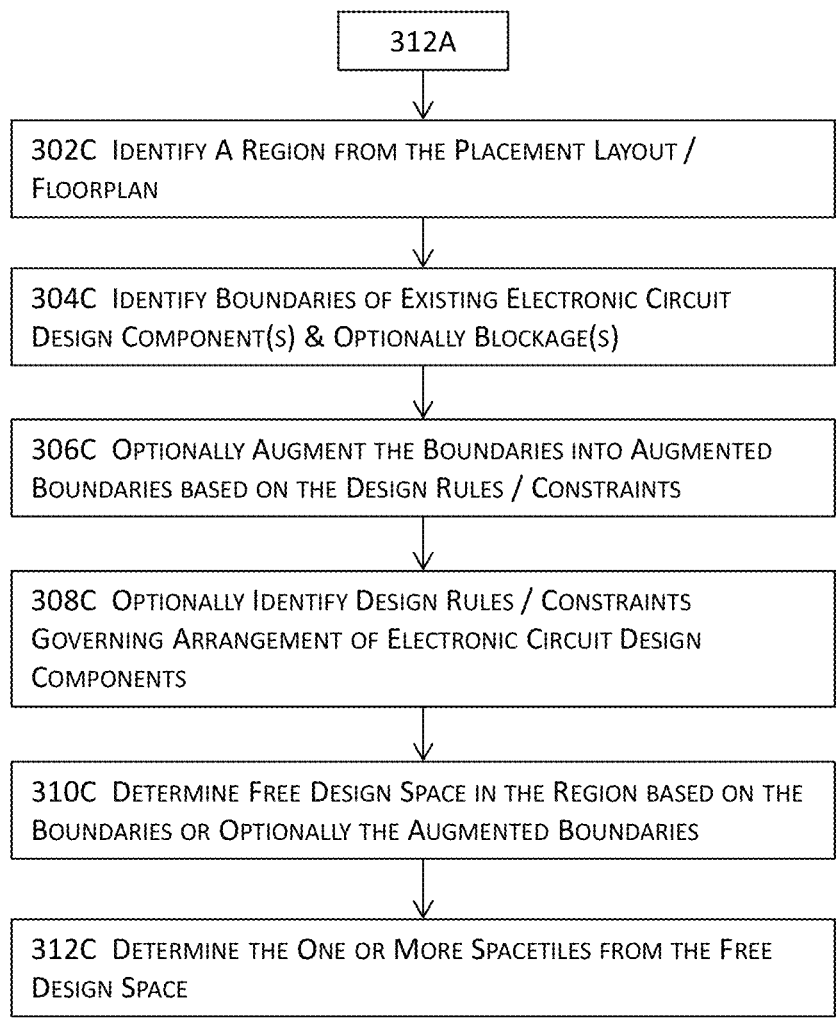
FIG. 3C illustrates a more detailed flow diagram about a part of the flow diagram illustrated in FIG. 3A in some embodiments.

FIG. 3C illustrates a more detailed flow diagram about a part of the flow diagram illustrated in FIG. 3A in some embodiments. More specifically, FIG. 3C illustrates more details about determining one or more spacetiles for a layout region. A region may be first identified at 302C in the floorplan or placement layout. This region is the subject of partitioning into spacetiles. The boundaries or bounding boxes of existing electronic circuit design components and the optional blockages may be identified at 304C. These identified boundaries or bounding boxes may be optionally augmented at 306C into augmented boundaries or bounding boxes at 308C. The amount of augmentation may be determined by, for example, the spacing design rule, parallel run length design rule that requires different spacing values based on the parallel run-length between two interconnects, etc. to ensure that no subsequently implemented electronic design components would encroach upon the space required by such design rules.

Other design rules may also apply; and these other design rules may include, for example, the pair rules or BC rules where B stands for blue and C stands for cyan in double patterning governing which two-width combinations are legal or triplet rule or BCB rule governing which three-width combinations are legal, etc., one or more other design rules such as a minimum length rule governing the minimum length required for an interconnect segment, a same track line-end design rule, a different track line-end design rule, a keep-out design rule, or one or more design rules governing repetitive track patterns, etc.

The free space may be determined in the region at 310C by punching out or carving out the space enclosed by the boundaries or bounding boxes or the augmented boundaries or bounding boxes. This free space may then be partitioned into one or more spacetiles at 312C. More details about the determination of spacetiles are described below by way of examples with reference to FIGS. 3D-3G as well as in the U.S. patent applications listed in the section entitled Cross Reference to Related Application.

Figure 3D:
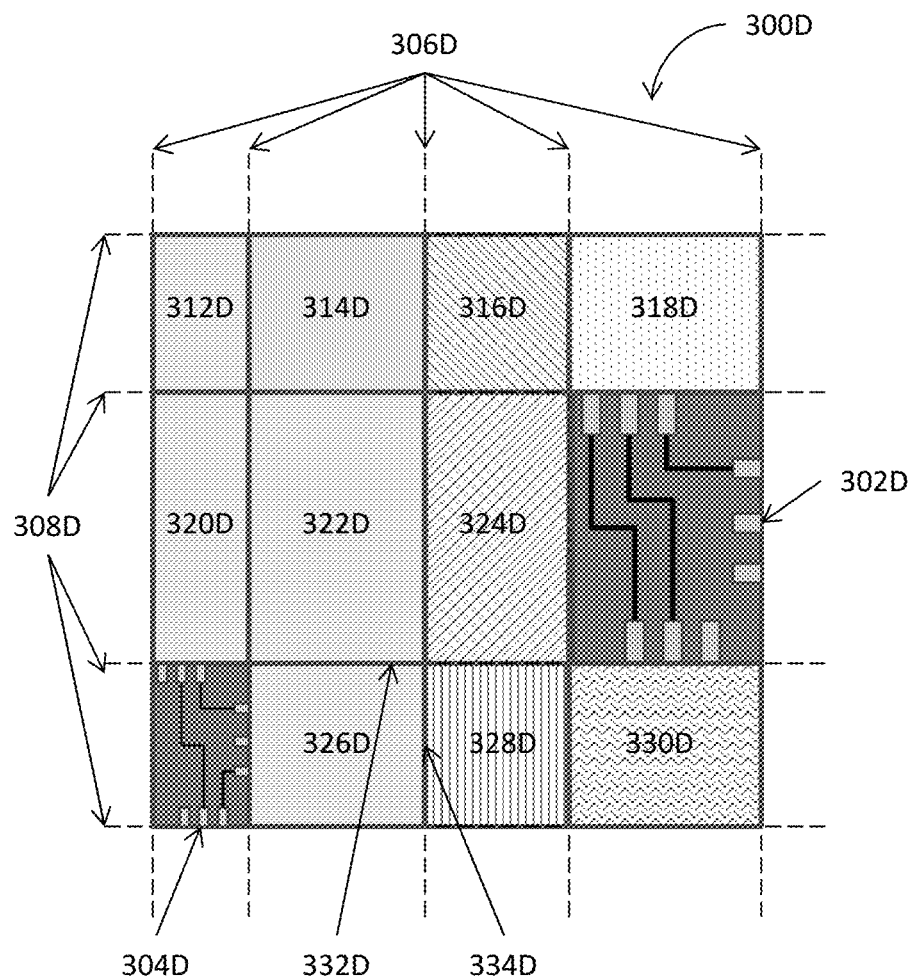
FIGS. 3D-3G illustrate some examples of the determination of spacetiles for a region in a simplified electronic design in some embodiments.

FIGS. 3D-3G illustrate some examples of the determination of spacetiles for a region in a simplified electronic design in some embodiments. FIG. 3D illustrates an example of tiling a layout region 300D in a layer (e.g., metal 2 or M2 layer) into a plurality of spacetiles. In this example, the layout region 300D includes two blocks of electronic design components 302D and 304D, each having a respective set of pins as shown in FIG. 3D. The right boundary segment of block 302D is aligned with the right boundary of the layout region; and the left boundary segment of block 304D is aligned with the left boundary of the layout region.

The layout region is further associated with a set of horizontal routing tracks 308D and a set of vertical routing tracks 306D. It shall be noted that not all layers of an electronic design may be associated with two orthogonal sets of routing tracks. For example, in some advanced node electronic designs, a layer may be associated with only one set of routing tracks (e.g., a set of horizontal routing tracks or a set of vertical routing tracks but not both). In these embodiments, a via will be used to continue a route to an adjacent layer when the route is required to make a turn.

In some embodiments, tiling the layout region 300D into spacetiles may first identify the boundaries of existing electronic design components. In this example, the boundary segments of blocks 302D and 304D may be identified for tiling purposes. For the ease of illustration and description, these boundaries are not augmented. The free design space within the layout region 300D may then be determined to by subtracting the space within the boundaries of blocks 302D and 304D from the space within the layout region 300D. In some embodiments, this free design space may be determined to be the spacetile despite the fact that the free design space constitutes an irregular polygonal shape.

In some embodiments, the routing tracks may be used to determine the spacetiles in the layout region 300D. In these embodiments, the free space may be further partitioned using the routing track segments within the free design space. As illustrated in FIG. 3D, the free design space may be partitioned into rectangular tiles 312D, 314D, 316D, 318D, 320D, 322D, 324D, 326D, 328D, and 330D. Each of these rectangular may be treated as a spacetile, and an area search probe may be associated with a spacetile. In addition, each vertical routing track segment (e.g., 332D) and each horizontal routing track segment (e.g., 334D) may be separately treated as a spacetile which is a degenerated one-dimensional geometric entity (a line segment). A search probe may also be associated with such a degenerated spacetile to search for viable routing solutions.

Figure 3E:
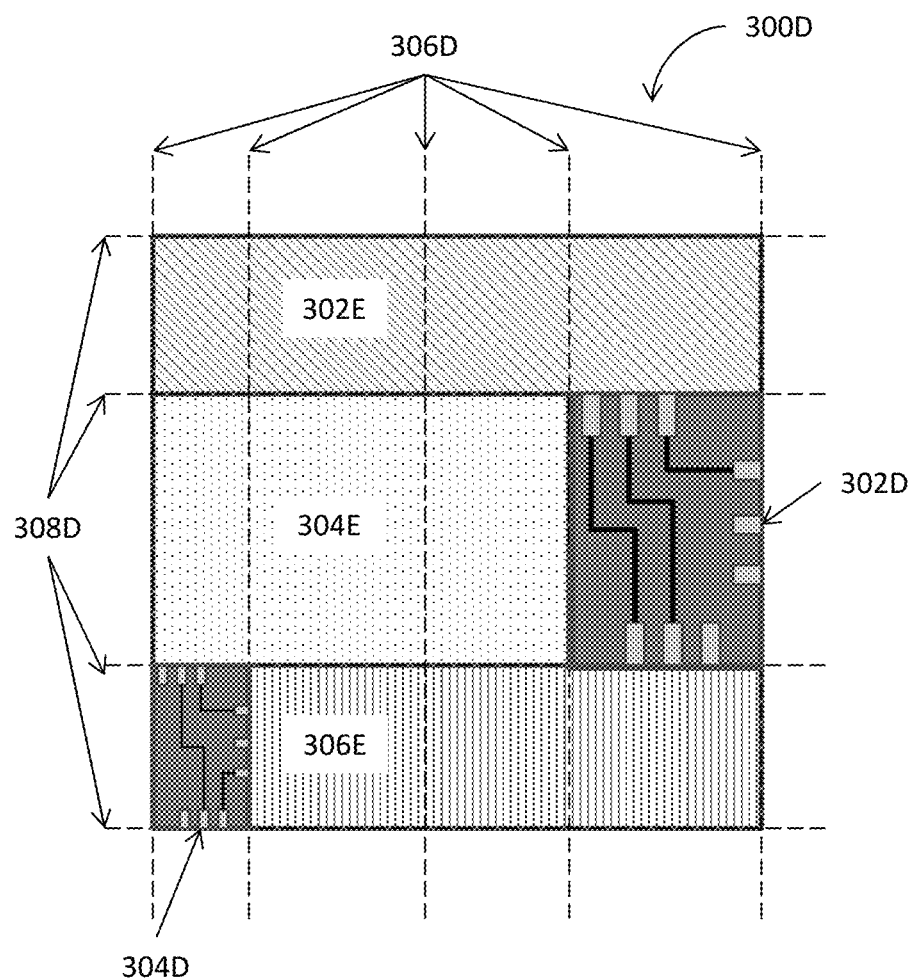

FIG. 3E illustrates another example of tiling the same layout region 300D. This example further illustrates that spacetiles may be merged. For example, spacetiles 312D, 314D, 316D, and 318D in FIG. 3D are merged into a single space tile 302E; spacetiles 320D, 322D, and 324D in FIG. 3D are merged into another single spacetile 304E; and spacetiles 326D, 328D, and 330D in FIG. 3D are merged into another single spacetile 306E.

FIG. 3E may also illustrate an example of tiling the same layout region 300D with a bias in favor of horizontal tiling. That is, the tiling process is biased in favor of forming horizontal spacetiles. In some embodiments, the bias may cause the spacetile tiling process to for maximum spanning spacetiles in the direction according to the bias. For example, the tiling process may form spacetiles to the maximum permissible extent according to the bias. The result is, as illustrated in FIG. 3E, spacetile 302E that spans across the entire width of the layout region 300D; and spacetiles 304E and 306E also span across the maximum permissible extent (i.e., the width of the layout region 300D minus the width of the space occupied by blocks 302D and 304D) in the horizontal direction according to the bias. In some embodiments, tiling may be biased on a per layer basis. For example, tiling the metal two layer may be biased in favor of the horizontal direction; and tiling the metal three layer may be biased in favor of the vertical direction. In some of these embodiments, a portion of a layer may be biased in favor of the horizontal direction, while another portion of the same layer may be biased in favor of the vertical direction.

Figure 3F:
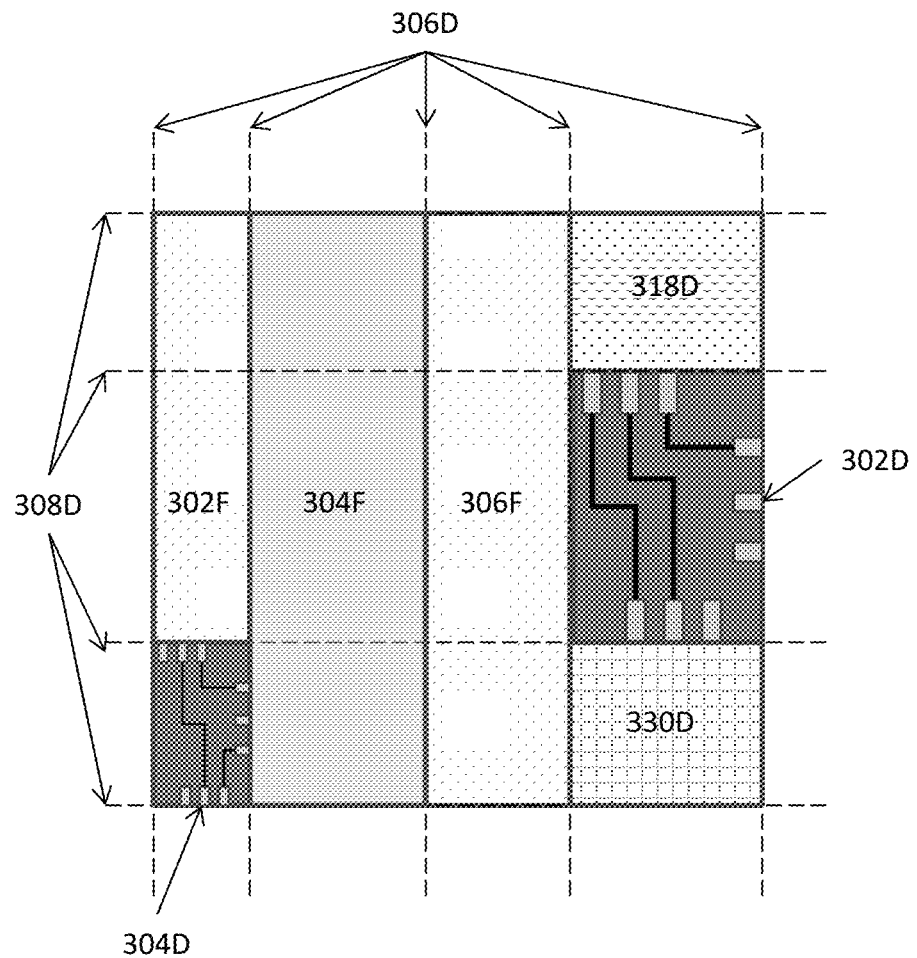

FIG. 3F illustrates another example of tiling the same layout region 300D. This example further illustrates merger of spacetiles in the vertical direction. For example, spacetiles 312D and 320D in FIG. 3D are merged into a single space tile 302F; spacetiles 314D, 322D, and 326D in FIG. 3D are merged into another single spacetile 304F; and spacetiles 314D, 326D, and 328D in FIG. 3D are merged into another single spacetile 306F. Spacetiles 318D and 330D remain identical to those in FIG. 3D due to no possibility of merging any of these two spacetiles with other spacetiles.

FIG. 3F may also illustrate an example of tiling the same layout region 300D with a bias in favor of vertical tiling. That is, the tiling process is biased in favor of forming vertical spacetiles. In this example, the tiling process may form spacetiles to the maximum permissible extent according to the bias in favor of vertical tiling. The result is, as illustrated in FIG. 3F, spacetiles 304F and 306F that span across the entire length of the layout region 300D; and spacetiles 302F also spans across the maximum permissible extent (i.e., the length of the layout region 300D minus the length of the space occupied by block 304D) in the vertical direction according to the bias.

Figure 3G:
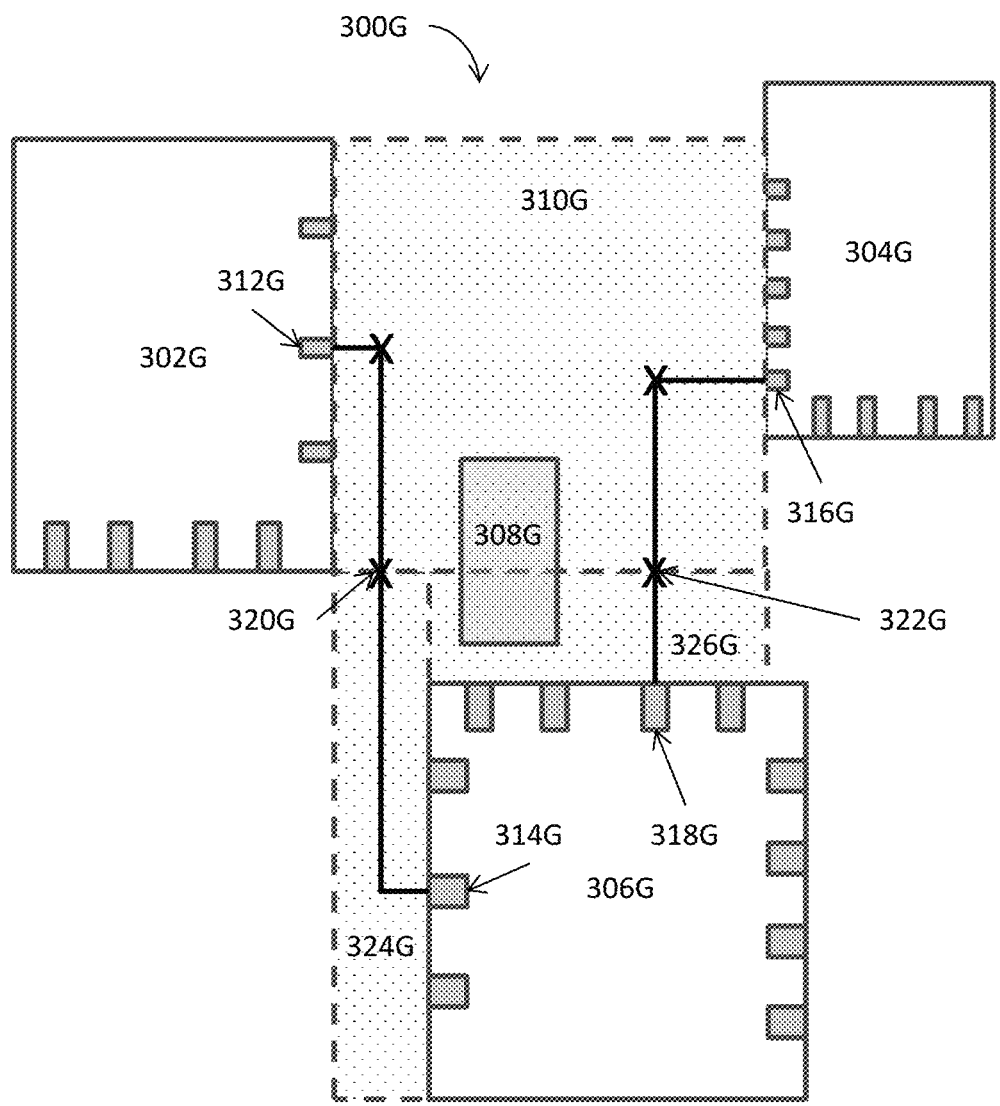

FIG. 3G illustrates another example of the determination of spacetiles in a layout region. In this example, the layout region 300G includes blocks 302G, 304G, and 306G that are interconnected as shown in FIG. 3G. The layout region 300G also includes a blockage 308G. In this example, the free design space may be similarly determined by discounting the space occupied by blocks 302G, 304G, and 306G or by the augmented boundaries of blocks 302G, 304G, and 306G.

In some embodiments, the blockage may also be considered in the determination of free design space that will be further partitioned into sub-spaces that will be transformed into corresponding spacetiles by associating area or line search probes as described above. In some other embodiments, blockages in the layout region 300G may be first ignored in the determination of free design space, and spacetiles may be formed without accounting for blockages. FIG. 3G illustrates these latter embodiments where blockage 308G is first ignored in the determination of the free design space 310G.

As it can be seen in FIG. 3G, temporarily ignoring blockage 308G results in a simpler free design space 310G—a rectangular geometric shape. The routing-aware floorplanner or routing-aware placement tool may invoke the router with a function call; and the router will attempt to generate geometric routes without accounting for blockage 308G. In this example, a first geometric route is generated to connect pin 312G of block 302G and pin 314G of block 306G; and a second geometric route is generated to connect pin 316G of block 304G and pin 318G of block 306G according to the connectivity that is part of the input data.

Moreover, a first switchbox routing problem may be constructed by including the spacetile 310G and the pins 312G and 316G. Two pseudo pins 320G and 322G may be further added to bottom edge of the spacetile 310G of the switchbox routing problem based on the connectivity that indicates pin 312G is to be connected to pin 314G that is directly below spacetile 310G, and pin 316G is to be connected to pin 318G that is also directly below spacetile 310G. With these two pseudo-pins 320G and 322G, the first switchbox routing problem can be independently solved to determine the respective geometric route segments. Two other switchbox routing problems may also be constructed for spacetiles 324G and 326G and solved with the pseudo-pins 320G and 322G accordingly. The solutions of these switchbox routing problems may then be aggregated to form the geometric routes.

In some of these embodiments, the routing-aware floorplanner, the routing-aware placement tool, or the router may examine these generated geometric routes to determine whether the ignored blockage 308G negatively affects the geometric routes. In some other embodiments, these geometric routes will not be checked against the ignored blockage 308G. Rather, these generated geometric routes may be graphically presented in the graphical user interface, and whether the ignored blockage 308G precludes the legality of the first and second geometric routes. In this example illustrated in FIG. 3G, the blockage 308G does not affect the legality of the first and second geometric routes, and thus ignoring the blockage 308G does not affect the routing solutions while conserving the computational resources in generating an otherwise more complex free design space and hence more spacetiles.

In some other embodiments, the blockage 308G may be accounted for in the determination of the free design space and hence the determination of spacetiles. Accounting for blockages almost always results in a free design space having more complex geometries and hence more spacetiles or a spacetile having more complex geometries for subsequent generation of geometric routes. On the other hands, the computational cost of generating geometric routes by a router described herein may be relatively much lower than determining free design space and subsequently tiling the free design space into spacetiles. Therefore, some embodiments may first ignore blockages in the determination of spacetiles and the generation of geometric routes until subsequent checks or the routing results indicate the need for considering these blockages in the generation of geometric routes. In some embodiments, a sliding scale approach may be employed to estimate the likelihood of negatively affecting generation of geometric routes by blockages and determine whether the blockages are to be considered in the determination of spacetiles and the subsequent generation of geometric routes with the generated spacetiles accordingly.

Figure 4:
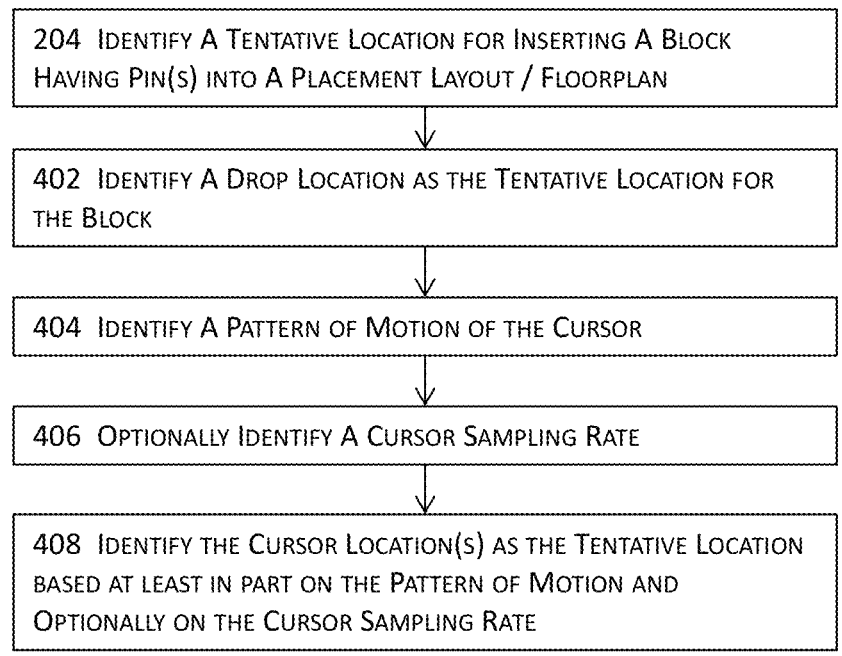
FIG. 4 illustrates a more detailed flow diagram about identification of tentative locations in the high level flow diagram illustrated in FIG. 2 in some embodiments.

FIG. 4 illustrates a more detailed flow diagram about identification of tentative locations in the high level flow diagram illustrated in FIG. 2 in some embodiments. In determining a tentative location for inserting a block into a floorplan or placement layout in an interactive or assisted mode, a drop location around which the point device cursor hovers for at least a configurable threshold period of time may be identified at 402 as a tentative location for the block. A tentative location includes a desired location at which a user intends to insert the block into the floorplan or placement layout. It shall be noted that in the automatic floorplanning or placement mode, electronic design components are inserted into the floorplan or the placement layout with no or minimal human intervention so the process illustrated in FIG. 4 and described below primarily applies to the interactive and/or assisted floorplanning or placement modes.

In addition to the identification of the drop location as a tentative location, the pattern or trajectory of motion of the cursor may be monitored at 404. A cursor sampling rate may be optionally identified at 406. For example, some embodiments may sample the motion of the cursor of a pointing device at a sampling rate of 50 milliseconds so as to capture the locations of the cursor once every 50 milliseconds. The pattern or trajectory of motion of the cursor may be monitored continuously within a time period, at one or more uniform and/or non-uniform discrete intervals, and/or one or more discrete time points. For example, the pattern or trajectory of the cursor movement may be continuously monitored during a first time period, sampled at a sampling rate during a second time period, and also monitored when the cursor hovers about a location in the design space at one or more discrete time points.

In addition to monitoring the pattern or trajectory of the cursor movement, the speed and/or acceleration at which the cursor moves may also be monitored to determine which cursor locations are to be captured as tentative locations. For example, a routing-aware floorplanner or a routing-aware placement tool may be configured to skip the capture of one or more positions of the cursor when it detects that the cursor is moving above a configurable threshold speed or is accelerating above a configurable threshold acceleration based on the assumption that the designer may not intend to drop the block when the cursor is moving at such a speed. Of course, the routing-aware floorplanner or a routing-aware placement tool may nevertheless capture the locations of the cursor as the tentative locations regardless of the speed at which the cursor is moving in some other embodiments.

One or more locations along the pattern or trajectory of the cursor movement may be identified at 408 as one or more additional tentative locations based in part or in whole upon the pattern or trajectory of cursor movement, the optional cursor sampling rate, the cursor speed, and/or the cursor acceleration in some embodiments.

Figure 5:
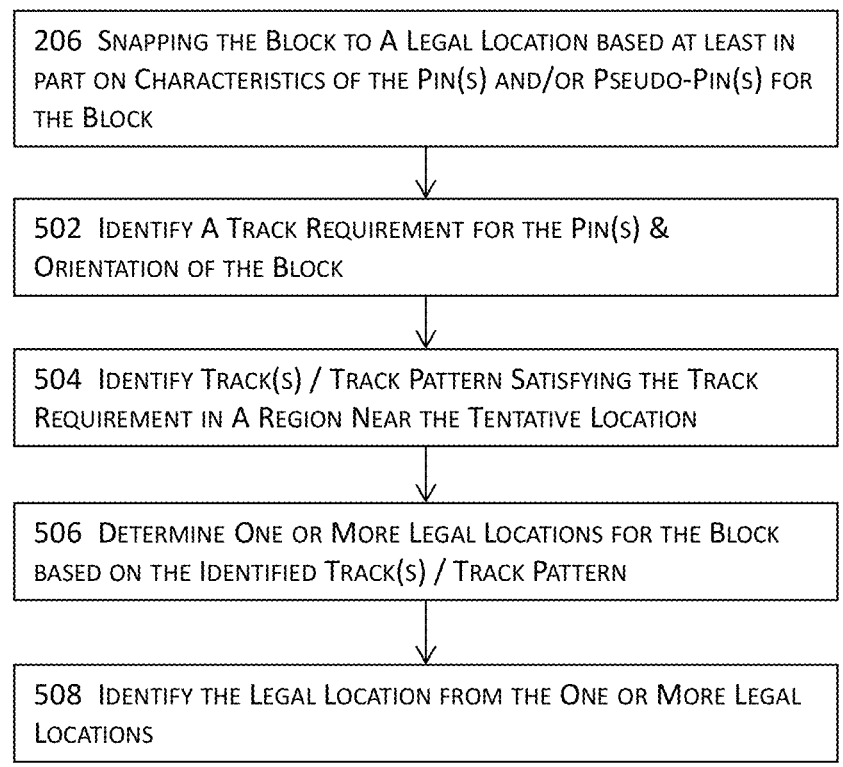
FIG. 5 illustrates a more detailed flow diagram about snapping a block to a legal location in the high level flow diagram illustrated in FIG. 2 in some embodiments.

FIG. 5 illustrates a more detailed flow diagram about snapping a block to a legal location in the high level flow diagram illustrated in FIG. 2 in some embodiments. At 502, a set of requirements for routing tracks or track patterns may be identified. These requirements may include, for example, permissible or legal routing direction(s) for a given layer (e.g., metal 2 or M2 layer), permissible or legal width values that may be assigned to or associated with routing tracks, permissible or legal arrangements of routing tracks associated with respective width values for shapes implemented thereupon, requirements for floorplanning or placement in rows, spacing requirements (e.g., minimum spacing rule, parallel run length design rule, etc.), or any other rules pertaining to floorplanning, placement, and/or routing with respect to routing tracks. More details about various design rules, constraints, and requirements for routing tracks and track patterns are described in the U.S. patent applications listed in the section entitled Cross Reference to Related Applications.

One or more routing tracks or one or more track patterns that satisfy the identified set of track requirements may be identified at 504 in the region. One of the objectives of the flow diagram illustrated in FIG. 5 is to snap a block to a legal location in a region of a floorplan or placement layout. It is assumed here that the floorplan or placement layout is a tracked design and is thus associated with routing tracks or one or more track patterns. It shall be noted that various techniques described herein apply with full and equal effects to both tracked or gridded electronic designs and trackless electronic designs.

During the preprocessing stage (e.g., 202 in FIG. 2), the block to be inserted has been preprocessed to identify, for example, the internal connections (e.g., wires, interconnects, shapes, etc.) In some cases where the block is also tracked and is thus associated with a set of routing tracks or one or more track patterns, information about this set of routing tracks or the one or more track patterns may also be extracted from the preprocessing of the block. Furthermore, when a block may be inserted into a floorplan or placement, the block is considered to be legal and complies with all the design rules, constraints, and requirements.

At 504, the routing-aware floorplanner or routing-aware placement engine is to examine the routing tracks or track patterns associated with the region into which the block is to be inserted and identify a set of routing tracks or one or more track patterns that match the routing tracks or track patterns of the block so that the resulting design, with the block inserted into the region, automatically complies with the pertinent design rules, constraints, and requirements. In some embodiments, this automatic compliance with the pertinent design rules, constraints, and requirements may completely set aside subsequent design rule checks (DRC), at least for the portions of an electronic design that are implemented with the techniques described herein.

With the one or more routing tracks or one or more track patterns identified at 504, one or more legal locations in the region may be determined at 506 for the block. For example, information about the internal connections, routing tracks, and/or one or more track patterns associated with the block may be identified during the preprocessing of the block (e.g., at 202 in FIG. 2). The geometric relation (e.g., X-offset and Y-offset of an internal connection, a routing track, etc.) between the origin of the block and these identified internal connections, routing tracks, and/or one or more track patterns may be determined. This geometric relation for the block may be mapped to the region with respect to the one or more routing tracks or one or more track patterns identified at 504; and the block origin may be mapped to the region using the geometric relation for each set of routing tracks or each track pattern that matches the routing tracks or track pattern of the block. The mapped block origin for each matching set of routing tracks or matching track pattern may be identified as a legal location for the insertion of the block.

In some embodiments where a plurality of legal locations are determined at 506, a final legal location may be identified at 508 from the plurality of legal locations. In some of these embodiments, a final legal location may be identified based in part or in whole upon, for example, the ranking of the plurality of legal locations. For example, the plurality of legal locations may be ranked based on flexibility in subsequent implementations of the floorplan or placement layout, routability (e.g., complexities of geometric routes, the total number of bends or vias, blockages, etc.), or any other suitable criteria.

When a specific legal location is selected for the insertion of a block, the choice of this specific legal location may impact the flexibility of subsequent implementations of the floorplan or placement layout. For example, a first legal location may correspond to a legal track pattern; and a second legal location may correspond to two legal track patterns. Although the block and hence the resulting floorplan or placement layout will be legal at both legal locations, the second legal location may provide greater flexibility in subsequent implementations because the second legal location is associated with two legal track patterns and may thus accommodate routing options than the first legal location that is associated with one legal track pattern.

Even when two legal locations are associated with the same number of sets of track patterns, different track patterns may nevertheless give rise to different flexibility in subsequent implementations. For example, a routing track associated with a larger width value may accommodate a greater number of shapes than a routing track associated with a smaller width value because a narrower shape having a smaller width may be implemented along a routing track associated with a larger width value, but not vice versa. With the final legal location identified at 508, the block may then be inserted at this final legal location.

Figure 6A:
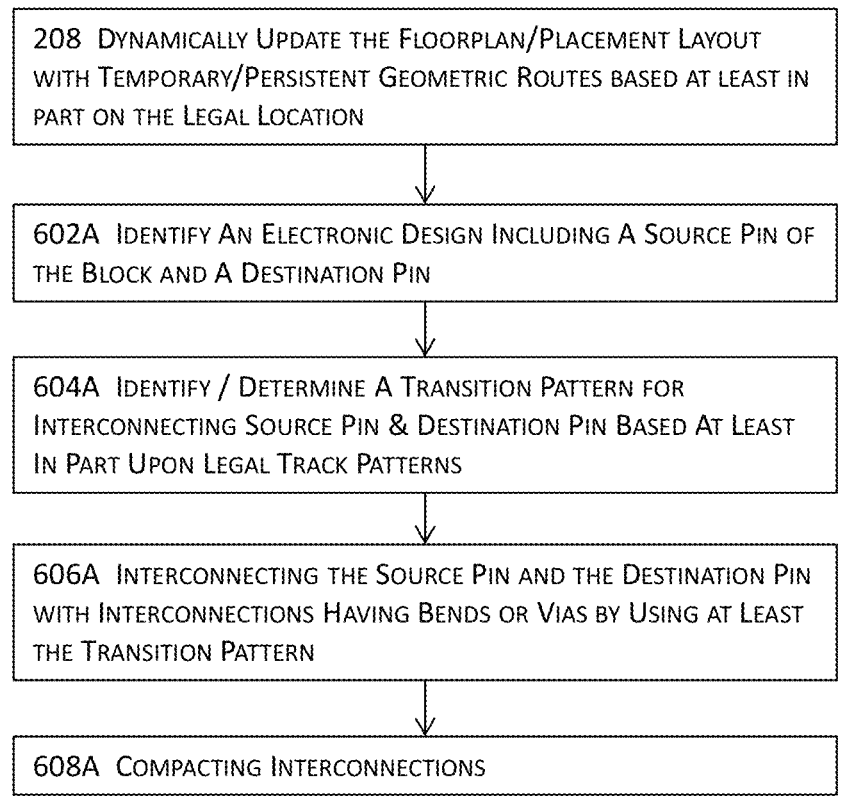
FIG. 6A illustrates a more detailed flow diagram about dynamic update of the floorplan or the placement layout in the high level flow diagram illustrated in FIG. 2 in some embodiments.

FIG. 6A illustrates a more detailed flow diagram about dynamic update of the floorplan or the placement layout in the high level flow diagram illustrated in FIG. 2 in some embodiments. In these embodiments illustrated in FIG. 6A, the method or system may first identify an electronic design that includes a source pin on a first track in a first cell, block, or area (collectively block hereinafter) of the electronic design and a destination pin on a second track in a second block of the electronic design at 602A.

A transition pattern for interconnecting the source pin and the destination pin may be identified or determined at 604A based at least in part upon the data or information included in a track or pattern database that includes information about a plurality of legal track patterns or a plurality of legal combinations of widths associated with corresponding tracks in track patterns. A transition pattern may include a schematic pattern from the corresponding schematic design or an actual interconnect pattern including one or more interconnect or wire segments that connect a source pin to a destination pin in some embodiments. In some embodiments, a transition pattern includes only the interconnect segments in the wrong-way direction but not the interconnect segments in the right-way direction in which a source pin or a destination pin lies.

More specifically, one or more characteristics of the transition pattern may be determined. These one or more characteristics of a transition pattern may include, for example, one or more widths for the one or more interconnect segments in the transition pattern. In some embodiments, the width to be associated with a routing track on which an interconnect segment lies may be determined to be the larger of the widths associated with the respective tracks on which the source and destination pins respectively lie. In some other embodiments, the width of an interconnect segment in a transition pattern may be determined by selecting a routing track that is associated with a width to satisfy one or more electrical requirement (e.g., the current density requirement, electro-migration requirement, etc.) or performance requirements or objectives (e.g., timing requirements, signal integrity, etc.)

A third routing track in a second routing direction may be identified or determined for the transition pattern. It shall be noted that the term "second routing direction" is used here to distinguish from the first routing direction in which the tracks for the source pin and the destination pin lie. The "second routing direction" does not imply that the routing layer on which the source pin and the destination pin reside allows for two routing directions. In other words, the third track identified may reside on the same routing layer with the source and the destination pins when wrong-way routing is permitted on this routing layer in some embodiments or on an immediately adjacent routing layer when wrong-way routing is prohibited in some other embodiments. The third track is to be identified or determined in such a way to satisfy various design rules described herein.

One or more neighboring pins may be identified for the source pin, the destination pin, or both the source pin and the destination pin. A neighboring pin includes a pin that may be available for implementing the interconnection between the source pin and the destination pin. A neighboring pin may be identified from an available track that is as close to the source pin or the destination pin as possible when one of the objectives is to reduce or minimize the length of certain nets (e.g., signal nets) in some embodiments. In some embodiments, a neighboring pin may be identified from a dummy track in a track pattern. More details about dummy tracks are described in the related U.S. patent applications in the Cross Reference to Related Applications section of this Application.

A dummy routing track may then be identified for the source pin, the destination pin, or both the source pin and the destination pin. In some of these embodiments illustrated in FIG. 6A, a dummy routing track may be identified based at least in part upon the dependencies described above. In addition, one or more neighboring routing tracks may be identified for the dummy track. In some of these embodiments, one or more characteristics (e.g., the respective widths or the respective photomask designations associated with these one or more neighboring tracks, etc.) may also be identified for these one or more neighboring routing tracks. These one or more neighboring routing tracks may reside on one side or both sides of the dummy track.

A determination may then be made to decide whether the dummy routing track associated with a desired width for implementing the transition pattern may be situated at a desired location based at least in part upon the transition pattern and the one or more characteristics of the one or more neighboring tracks. In these embodiments, the process or module may examine various design rules including, for example, the pair design rule, the triplet design rule, the photomask designation design rule, etc. to determine whether the track pattern including the dummy track at the desired location satisfies various design rules so that the resulting track pattern results in a legal track pattern.

In some embodiments, a database, matrices, or tables including legal combinations of widths associated with corresponding tracks or legal track patterns may be consulted to determine whether the dummy routing track is located at a desired location. If a track pattern including one or more dummy tracks in the floorplan or placement portion of interest has already been determined, a dummy track may be identified from the one or more dummy tracks. On the other hand, if there is no dummy track or track patterns in the floorplan or placement portion of interest, a candidate location for the dummy track may be located and another determination may be made to decide whether a dummy routing track may be inserted at the candidate location based at least in part upon one or more neighboring tracks and their respective characteristics described above.

One or more intermediate routing tracks may be optionally arranged, rearranged, or inserted to bride an existing routing track (e.g., the identified one or more neighboring tracks) with the dummy track to satisfy various design rules. For example, if the dummy routing track for interconnecting the source pin and the destination pin is to be associated with a large width, but the immediately neighboring routing track is associated with a small width such that the combination of these two widths fails to constitute a legal combination, one or more intermediate routing tracks may be inserted therebetween to render the resulting track pattern or combination legal. In addition, a dummy pin may be inserted along the dummy track at the boundary of the first block or the second block; and the transition pattern may then be created by using one or more dummy pins, the third track, and the third track. More details about the identification or determination of a transition pattern are described in the U.S. patent applications listed in the first paragraph entitled Cross Reference to Related Applications.

At 606A, the method or system may interconnect the source pin and the destination pin with one or more bends or vias, depending upon whether wrong-way routing is permitted, by using at least the transition pattern. For example, if wrong-way routing is permitted for the electronic design, the method or system may implement the interconnections with one or vias, if needed. On the other hand, wrong-way routing may be prohibited in some electronic designs or certain layers thereof. In this latter case, the method or system may implement the interconnections between the source and destination pins with one or more vias. At 608A, the method or system may optionally compact at least some wire segments for the electronic design.

Figure 6B:
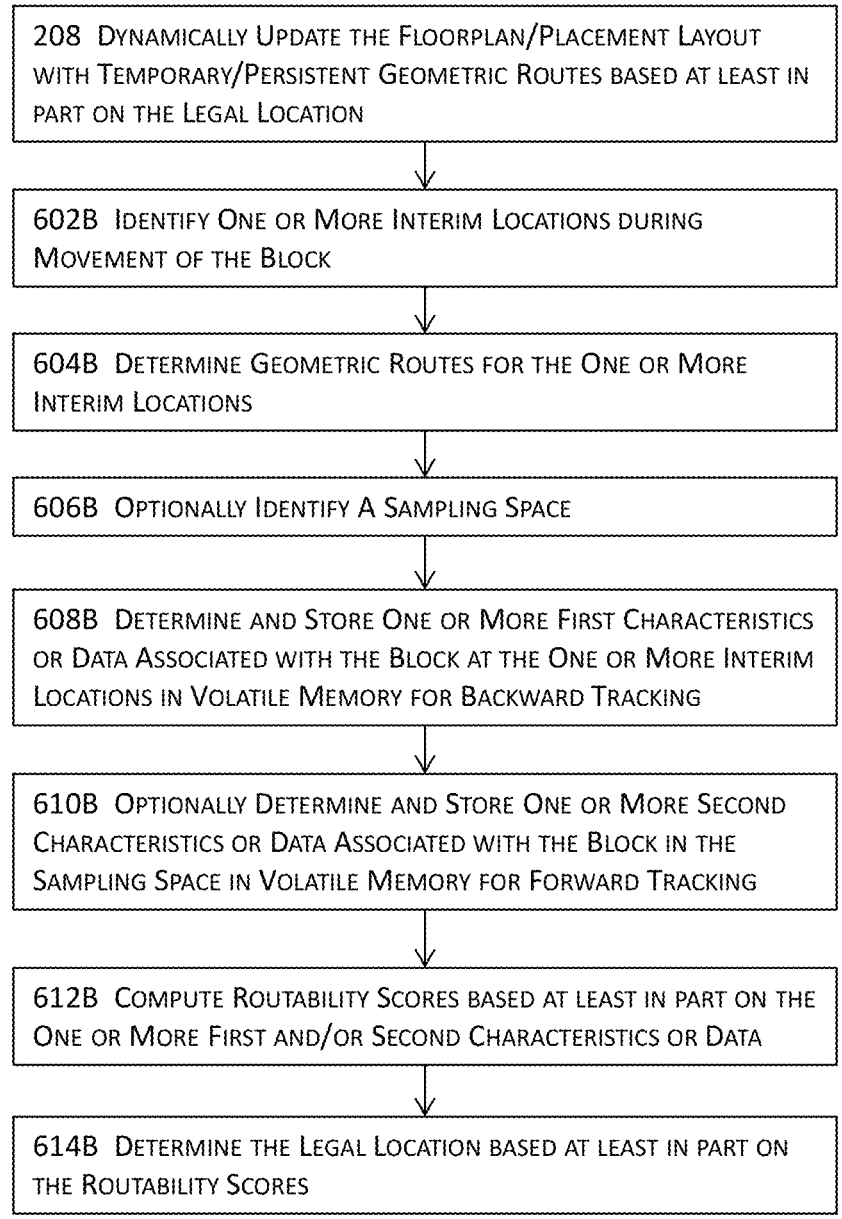
FIG. 6B illustrates another more detailed flow diagram about dynamic update of the floorplan or the placement layout in the high level flow diagram illustrated in FIG. 2 in some embodiments.

FIG. 6B illustrates another more detailed flow diagram about dynamic update of the floorplan or the placement layout in the high level flow diagram illustrated in FIG. 2 in some embodiments. As described above, the techniques described herein may capture multiple tentative locations while a block is being moved in a floorplan or placement layout. Due to the efficiencies of the router, the routing-aware floorplanner, and the routing-aware placer, these techniques may generate and present the geometric routes dynamically or on the fly as the block is being moved in the floorplan or placement layout. One or more interim locations (e.g., one or more additional tentative locations identified in FIG. 4) may be identified at 602B while the block of interest is being manipulated in the floorplan or placement layout.

Geometric routes may be generated at 604B for each of the one or more interim locations. In addition, a sampling space may be optionally identified at 606B. This sampling space includes a part of the design space that the router, the routing-aware floorplanner, and/or the routing-aware placer will look ahead into and analyze to determine the geometric routes as well as the impact of the geometric routes on other portion of the floorplan or placement layout even before the block is moved into this sampling space. In some embodiments, this sampling space may also be considered as the range of influence and may be identified based on the direction, speed, and/or acceleration of the cursor movement.

The extent of a sampling space may affect the optimality of the floorplan or placement layout and/or the optimality of the generated geometric routes because the sampling space represents the portion of the design space that the router, the routing-aware floorplanner, and/or the routing-aware placer analyzes when performing their designed functions. The larger the sampling space is, the more likely the floorplan or the placement layout will be closer to an optimal design because the floorplan or the placement layout has been implemented while accounting a larger portion of the entire floorplan or placement layout or even the entire floorplan or placement layout. Nonetheless, this enhanced likelihood of optimality is obtained at the expense of more utilization of computational resources and longer runtime due to a larger design space to cover. On the other hand, a smaller sampling space often results in a quicker determination of solutions with less computational resource utilization although at the expense of lesser scope of coverage of the entire design space and thus lower likelihood of the floorplan or placement layout being optimal.

With the geometric routes determined for the one or more interim locations, one or more first characteristics or data that are associated with the block at each of these one or more interim locations may be determined at 608B and stored in a volatile memory for backward tracking. These one or more first characteristics or data may include, for example, electrical characteristics such as resistance, parasitics, etc. For example, the routing-aware floorplanner/placer or the router may determine the parasitics at each of the one or more interim locations and find that the parasitics become worse as the block is being moved along the trajectory or pattern. In this example, these techniques may snap the block back to a legal location that corresponds to a previously analyzed interim location.

One or more second characteristics or data that are associated with the block may be optionally determined at 610B to enable the forward tracking capability of the routing-aware floorplanner/placer or the router. These one or more second characteristics may also be stored in volatile memory and may include, for example, congestion, complexities of the geometric routes and/or the floorplan or the placement layout, the impact of inserting the block at each interim location on flexibility of subsequent implementations, routability of the remaining portion of the floorplan or placement layout, etc.

For example, these techniques may evaluate the routability of the floorplan or placement layout by looking ahead into the sampling space even when the block is not yet moved into the sampling space. For example, these techniques may determine that the routability associated with one or more potential locations in the sampling space decreases as the block is further moved along the predicted trajectory or pattern into the sampling space. In this example, the routing-aware floorplanner, the routing-aware router is configured with the forward tracking capability and may thus select one of the prior interim locations as the tentative location or the corresponding legal location for the block.

Routability scores may be computed at 6126 for the tentative locations and/or the one or more interim locations based in part or in whole upon the one or more first characteristics or data and/or the one or more second characteristics or data. For example, the routability score at a location may be penalized with higher individual or aggregated resistance or parasitics of the geometric routes. Routability scores may also be penalized for a result floorplan or placement layout having higher complexities, higher congestion, worse flexibility in subsequent implementations, and/or routability of the remaining portion of the floorplan or placement layout. A final legal location for the block may be determined at 614B based at least in part upon the routability scores of the tentative locations and/or the one or more interim locations.

Figure 6C:
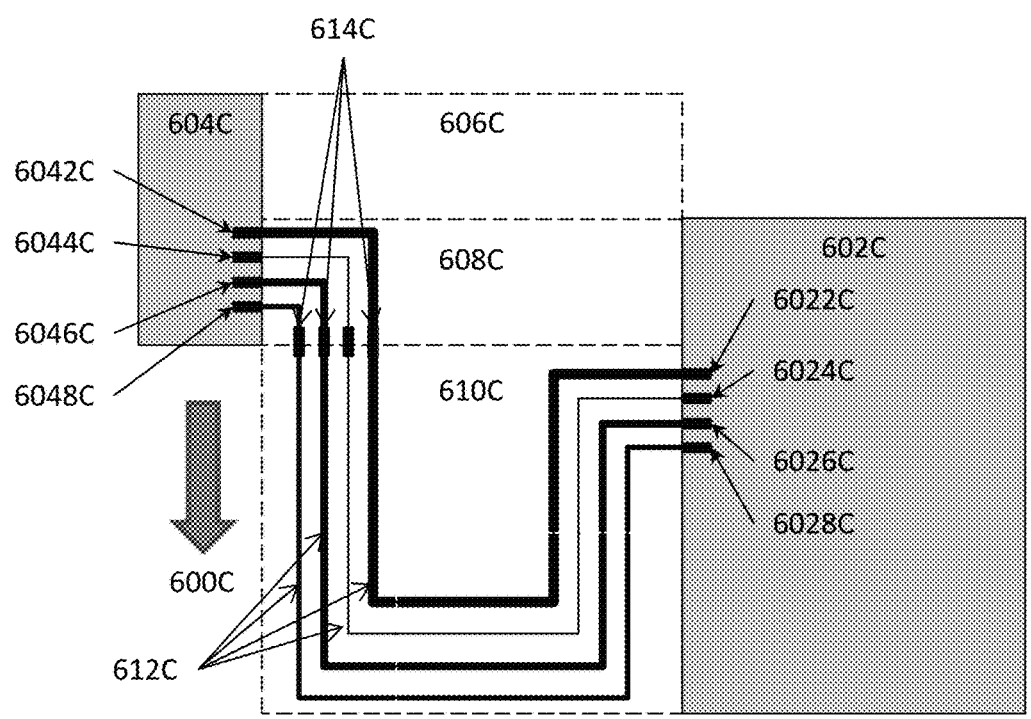
FIGS. 6C-6G illustrates some examples of dynamic update of a portion of a floorplan or a placement layout of an electronic design in some embodiments.

FIG. 6C illustrates an example of a portion of a simplified floorplan or placement layout in some embodiments. In these embodiments, the portion includes the first block 602C and the second block 604C where the second block 604C is being moved along the downward direction indicated by 600C. The first block 602C includes four actual pins 6022C, 6024C, 6026C, and 6028C; and the second block 604C includes four actual pins 6042C, 6244C, 6046C, and 6048C as illustrated in FIG. 6C.

Free design space may be identified in the region; and the free design space may be partitioned to determine spacetiles 606C, 608C, and 610C with the techniques described above with reference to FIGS. 3C-3G. Area search probes and/or line search probes may be associated with the spacetiles and may be used to search for viable solutions. As described above, two or more spacetiles may be merged into a single spacetile. For example, spacetiles 606C and 608C may be merged into a single spacetile.

Assuming the second block 604C is located at a legal location. The techniques described herein generate geometric routes according to the connectivity. The connectivity requires four wires 612C having their respective widths as required by their respective underlying routing tracks—the first wire connecting pin 6042C and 6022C; the second wire connecting pin 6044C and pin 6024C; the third wire connecting pin 6026C and 6046C; and the fourth wire connecting pin 6028C and pin 6048C. As described above, a switchbox routing problem may be constructed for each spacetile where the corresponding actual pins may be assigned to the corresponding switchbox routing problems.

In this example, a first switchbox routing problem may be constructed for spacetile 608C, and a second switchbox routing problem may be constructed for spacetile 610C. The first switchbox routing problem for spacetile 608C may be configured to include the actual pins 6042C, 6044C, 6046C, and 6048C. In addition, pseudo-pins 614C may be artificially inserted so that the first switchbox routing problem is independently solved. Similarly, the second switchbox routing problem may be created for spacetile 610C, and actual pins 6022C, 6024C, 6026C, and 6028C of the first block 602C may be assigned to the second switchbox routing problem. For the second switchbox routing problem to be independently solved, the same pseudo-pins 614C may also be assigned to the second switchbox routing problem. These two switchbox routing problems may then be solved sequentially or in parallel.

It shall be noted that the example illustrated in FIG. 6C includes two separate switchbox problems—one for the region defined by spacetile 608C, and the other for the region defined by spacetile 610C. As described above, spacetiles may be manipulated in a variety of different ways. In some embodiments where, for example, spacetiles 608C and 610C (and optionally 606C) are merged into a single spacetile encompassing both 608C and 610C (and optionally 606C), the result is a single switchbox problem having actual pins 6042C, 6044C, 6046C, 6048C, 6022C, 6024C, 6026C, and 6028C. In addition, the pseudo-pins 614C are no longer needed in this single switchbox problem.

Figure 6D:
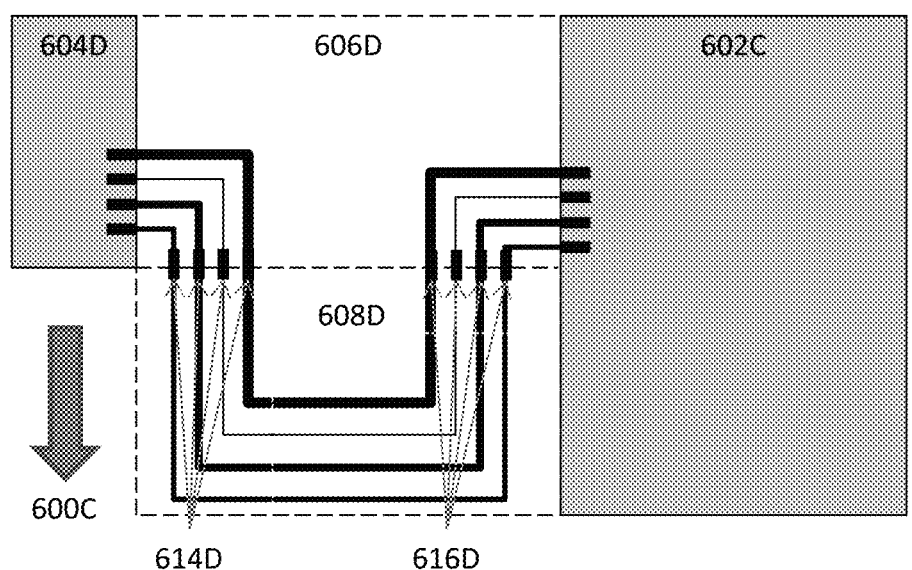

FIG. 6D illustrates the same example where the second block 604C is moved along the direction represented by 600C to a new location indicated by 604D. FIG. 6D further illustrates the dynamic or incremental capability of tiling of the free design space and the generation of spacetiles. As FIG. 6D shows, the free design space may be partitioned dynamically; and spacetiles 606D and 608D may be generated or updated dynamically or on the fly when the second block is moved to 604D. The geometric routes are also incrementally, dynamically updated or recreated according to the manipulation of the second block as shown in FIG. 6D. The pseudo-pins may also be dynamically, incrementally adjusted or recreated. In this example, in addition to the pseudo-pins 614D at the interface between spacetiles 606D and 608D, another set of pseudo-pins 616D may also be created so that the two switchbox routing problems respectively created for spacetiles 606D and 608D can be independently solved.

Similar to the example illustrated in FIG. 6C, the example illustrated in FIG. 6D also includes two separate switchbox problems—one for the region defined by spacetile 606D, and the other for the region defined by spacetile 608D. In some embodiments where spacetiles 606D and 608D are merged into a single spacetile encompassing both 606D and 608D, the result is again a single switchbox problem having the actual pins, but the pseudo-pins 614D and 616D are no longer needed in this single switchbox problem as the single switchbox problem described above with reference to FIG. 6C.

Figure 6E:
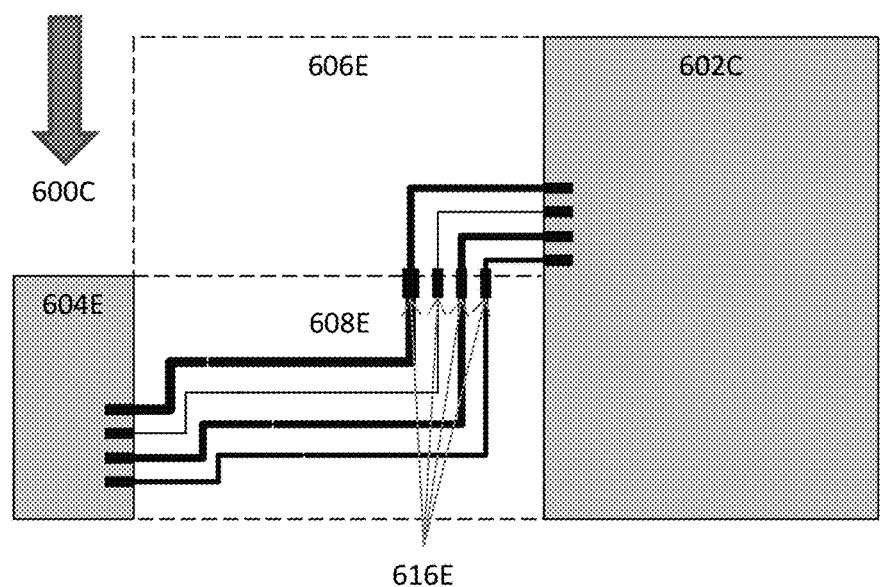

FIG. 6E illustrates the same example where the second block 604C is further moved along the direction represented by 600C to a new location indicated by 604E. FIG. 6E also illustrates the dynamic or incremental capability of tiling of the free design space and the generation of spacetiles. As FIG. 6E shows, the free design space may be partitioned dynamically; and spacetiles 606E and 608E may be generated or updated dynamically or on the fly when the second block is moved to 604E. The geometric routes are also incrementally, dynamically updated or recreated according to the manipulation of the second block as shown in FIG. 6E. The pseudo-pins may also be dynamically, incrementally adjusted or recreated. In this example, the set of pseudo-pins 616E may be created or adjusted along the interface between spacetiles 606E and 608E so that the two switchbox routing problems respectively created for spacetiles 606E and 608E can be independently solved.

Similar to the examples illustrated in FIGS. 6C-6D, the example illustrated in FIG. 6E again includes two separate switchbox problems—one for the region defined by spacetile 606E, and the other for the region defined by spacetile 608E. In some embodiments where spacetiles 606E and 608E are merged into a single spacetile encompassing both 606E and 608E, the result is a single switchbox problem having the actual pins, but the pseudo-pins 616E are no longer needed to solve this single switchbox problem as the single switchbox problems described above with reference to FIGS. 6C-6D.

Figure 6F:
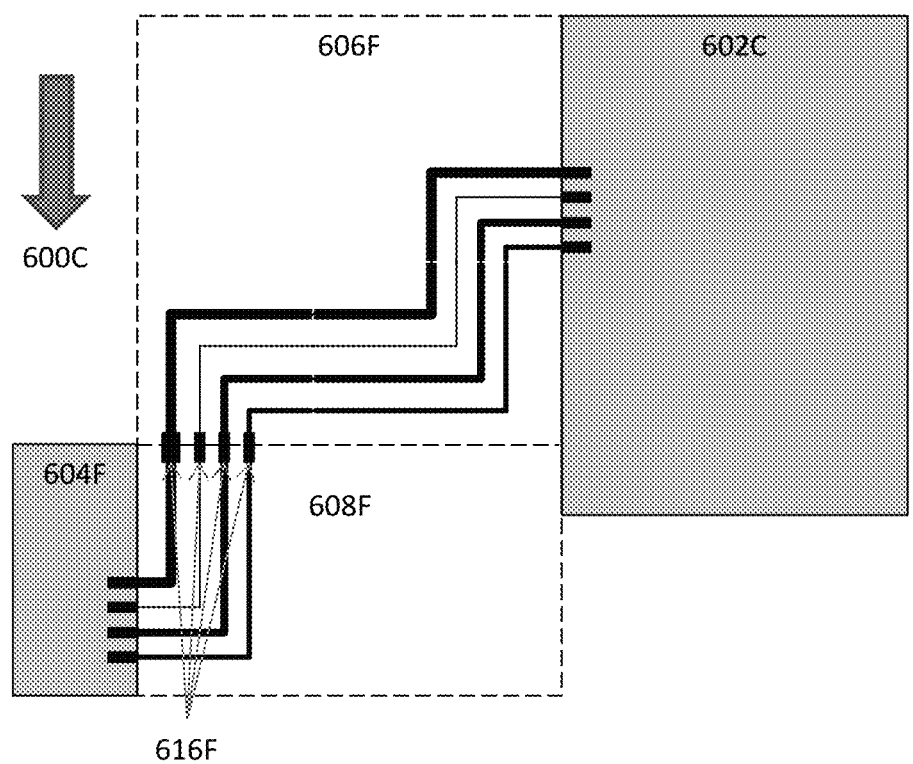

FIG. 6F illustrates the same example where the second block 604C is further moved along the direction represented by 600C to a new location indicated by 604F. FIG. 6F also illustrates the dynamic or incremental capability of tiling of the free design space and the generation of spacetiles. As FIG. 6F shows, the free design space may be partitioned dynamically; and spacetiles 606F and 608F may be generated or updated dynamically or on the fly when the second block is further moved to 604F. The geometric routes are also incrementally, dynamically updated or re-generated according to the manipulation of the second block as shown in FIG. 6F. The pseudo-pins may also be dynamically, incrementally adjusted or recreated. In this example, the set of pseudo-pins 616F may be created along the interface between spacetiles 606F and 608F so that the two switchbox routing problems respectively created for spacetiles 606F and 608F can be independently solved.

Similar to the examples illustrated in FIGS. 6C-6E, the example illustrated in FIG. 6F again includes two separate switchbox problems—one for the region defined by spacetile 606F, and the other for the region defined by spacetile 608F. In some embodiments where spacetiles 606F and 608F are merged into a single spacetile encompassing both spacetiles 606F and 608F, the result is again a single switchbox problem having the actual pins, but the pseudo-pins 616F are no longer needed to solve this single switchbox problem as the single switchbox problems described above with reference to FIGS. 6C-6E.

Figure 6G:
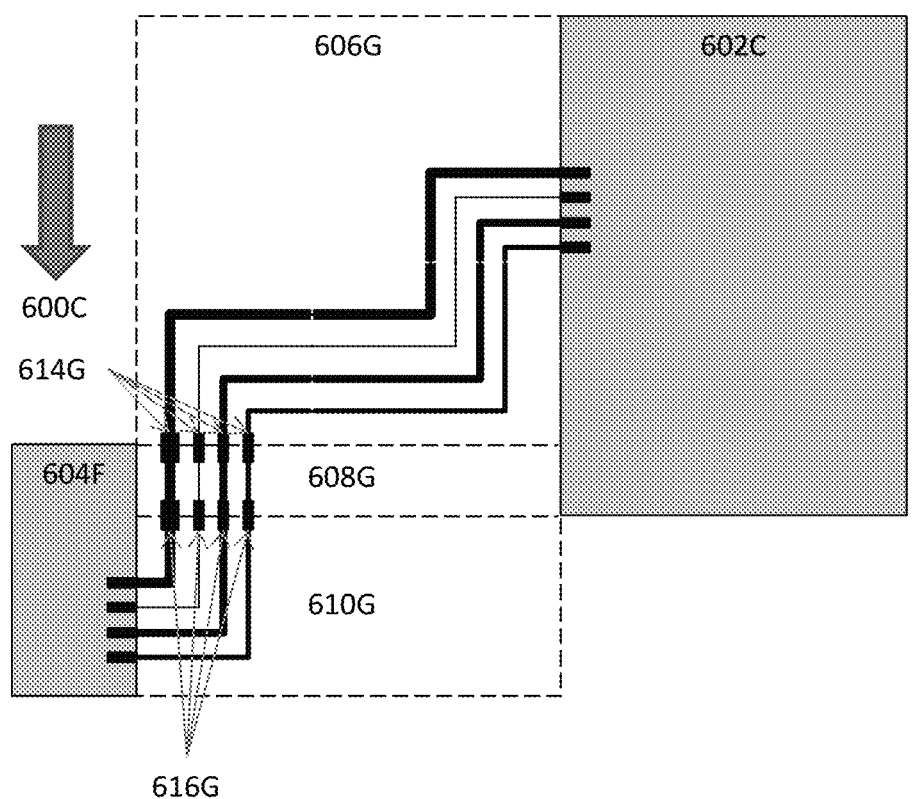

FIG. 6G illustrates the same example where the second block 604C is further moved along the direction represented by 600C to a new location indicated by 604G. FIG. 6G also illustrates the dynamic or incremental capability of tiling of the free design space and the generation of spacetiles. As FIG. 6G shows, the free design space may be partitioned dynamically; and spacetiles 606G, 608G, and 610G may be generated or updated dynamically or on the fly when the second block is further moved to 604G. The geometric routes are also incrementally, dynamically updated or re-generated according to the manipulation of the second block as shown in FIG. 6G. The pseudo-pins may also be dynamically, incrementally adjusted or recreated. In this example, two sets of pseudo-pins 614G and 616G may be created along the interface between spacetiles 608G and 610G and the interface between spacetiles 606G and 608G so that the three switchbox routing problems respectively created for spacetiles 606G, 608G, and 610G can be independently solved.

Similar to the examples illustrated in FIGS. 6C-6F, the example illustrated in FIG. 6G again includes two separate switchbox problems—one for the region defined by spacetile 606G, another for the region defined by spacetile 608G, and the other for the region defined by spacetile 610G. In some embodiments where spacetiles 606G, 608G, and 610G are merged into a single spacetile encompassing all three spacetiles 606G, 608G, and 610G, the result is again a single switchbox problem having the actual pins, but the pseudo-pins 614G and 616G are no longer needed to solve this single switchbox problem as the single switchbox problems described above with reference to FIGS. 6C-6E. In some other embodiments, fewer than all of these spacetiles in the region of interest may be merged. For example, spacetiles 608G and 610G may be merged into a single spacetile. In these embodiments, there will be two switchbox problems—one for the region defined by the merged spacetiles 608G and 610G, and the other for the region defined by the spacetile 606G. The pseudo-pins 616G will no longer be needed although pseudo-pins 614G may still be needed to complete these two individual switchbox problems. These examples illustrated in FIGS. 6C-6G demonstrate the flexibility of some embodiments described herein by manipulating and thus forming a set of switchbox problems for serial or parallel solutions. In some embodiments, the manipulation of spacetiles (e.g., merger) and hence the generation of the set of switchbox problems may be determined based on a sliding scale based in part or in whole upon one or more criteria including, for example, the relative complexities of individual switchbox problems, the number of computing nodes invoked in solving such switchbox problems, computational resources estimated or required for solving each switchbox problem or an average thereof, load balancing among the number of computing nodes employed for solving the set of switchbox problems, etc.

Figure 7:
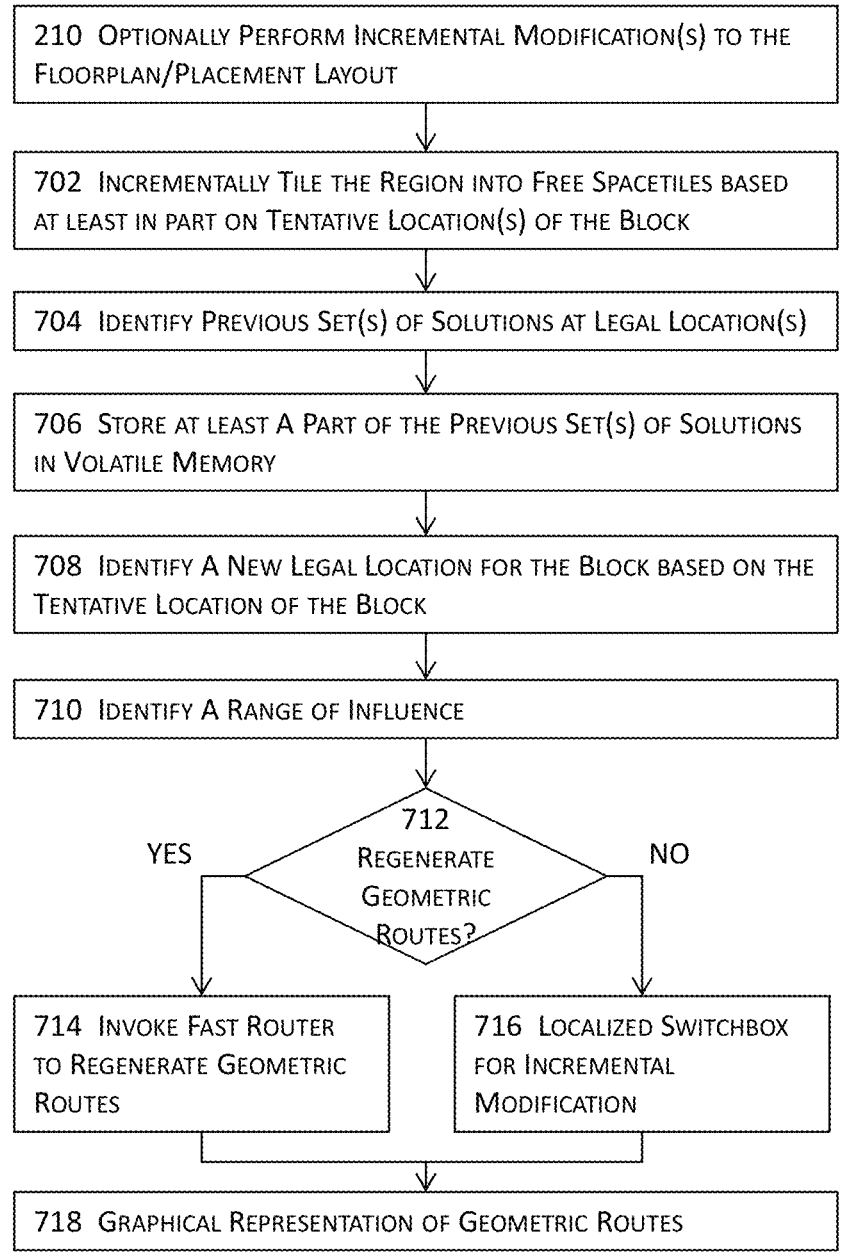
FIG. 7 illustrates a more detailed flow diagram about incremental modifications of a floorplan or placement layout in the high level flow diagram illustrated in FIG. 2 in some embodiments.

FIG. 7 illustrates a more detailed flow diagram about incremental aspects of various techniques for a routing-aware floorplanner or placer in the high level flow diagram illustrated in FIG. 2 in some embodiments. In these embodiments, a block is being manipulated (e.g., the block is being translated, rotated, mirrored, etc.) in the floorplan or placement layout. In some embodiments, the region (e.g., the region identified at 302A) or the free design space thereof (e.g., the free design space identified at 310C) may be incrementally tiled into one or more free spacetiles at 702 based in part or in whole upon one or more tentative locations that are identified while the block is being moved. For example, when a block is moved to a tentative location at a time point, the free space and hence the free spacetiles in the region of interest may be incrementally, dynamically updated or recreated based on the current tentative location of the block relative to the existing electronic design components in the region.

One or more previous sets of solutions may be identified at 704. A set of solutions may include, for example, a resulting floorplan, a resulting placement layout, generated geometric routes, etc. At least a part of these one or more previous sets of solutions may be stored in volatile memory (e.g., random access memory) at 706. For example, some previous sets of solutions may be stored in memory for backward tracking purposes or for subsequent modification or repairs so that a block may be snapped to a previously determined legal location.

A new legal location for the block may be identified at 708 based in part or in whole upon the current, tentative location of the block that is being moved. The determination of a legal location corresponding to a tentative location of the block is described in greater details above with reference to FIG. 5. A range of influence or a sampling space may be identified at 710. This range of influence or sampling space represents a smaller portion of the design space in some embodiments or the entire design space in some other embodiments where the routing-aware floorplanner, the routing-aware placer, and/or the router will look into to determine the impact of inserting the block at the new legal location corresponding to the current, tentative location.

A range of influence may be determined in a variety of different ways and may include a smaller localized portion in some embodiments or even the entire floorplan or placement layout in some other embodiments. In some embodiments where a block or pin is moved or inserted into a floorplan or placement layout, a range of influence may be determined by at least re-tiling a local region (or even the entire floorplan or placement layout in some embodiments) and further by identifying free spacetiles that include or touch upon the block or pin, geometric routes pertaining to the block or pin, and/or spacetiles pertaining to one or more other blocks and/or pins that are connected to the block that is being inserted or moved. In some other embodiments, rather than re-tiling at least a local region pertaining to the block or pin being moved or inserted, a bounding box may be created to encompass, for example, the geometric routes pertaining to the block or pin, one or more other blocks or pins connected to the block or pin, and/or additional areas beyond the aforementioned geometric routes and the additional blocks or pins.

A determination may be made at 712 to decide whether geometric routes are to be regenerated. If the determination result at 712 is affirmative, a fast router may be invoked by a function call to generate geometric routes at least for the block at the new legal location. In some of these embodiments, one or more other geometric routes that are within the range of influence and are negatively affected by the block at the new legal location may also be regenerated. It shall be noted that these one or more other geometric routes may or may not pertain to the block being inserted.

On the other hand, if the determination result at 712 is negative, the existing geometric routes may be modified based on the new legal location of the block. That is, when it is determined at 712 not to regenerate geometric routes for the block at the new legal location, existing geometric routes may be modified to cope with the manipulation of the block at this new legal location. In some embodiments, such modifications may not even invoke the router. For example, the block may be moved or snapped to the new legal location while the only modifications to the existing geometric routes are to lengthen (or shorten) the existing geometric routes. In this example, the existing routes may be simply lengthened (or shortened) by modifying the temporary design data without the invocation of a router. Once the geometric routes are regenerated (at 714) or modified (at 716) according to the block at the new legal location, the regenerated or modified geometric routes may be graphically presented at 718 in a graphical user interface.

Figure 8A:
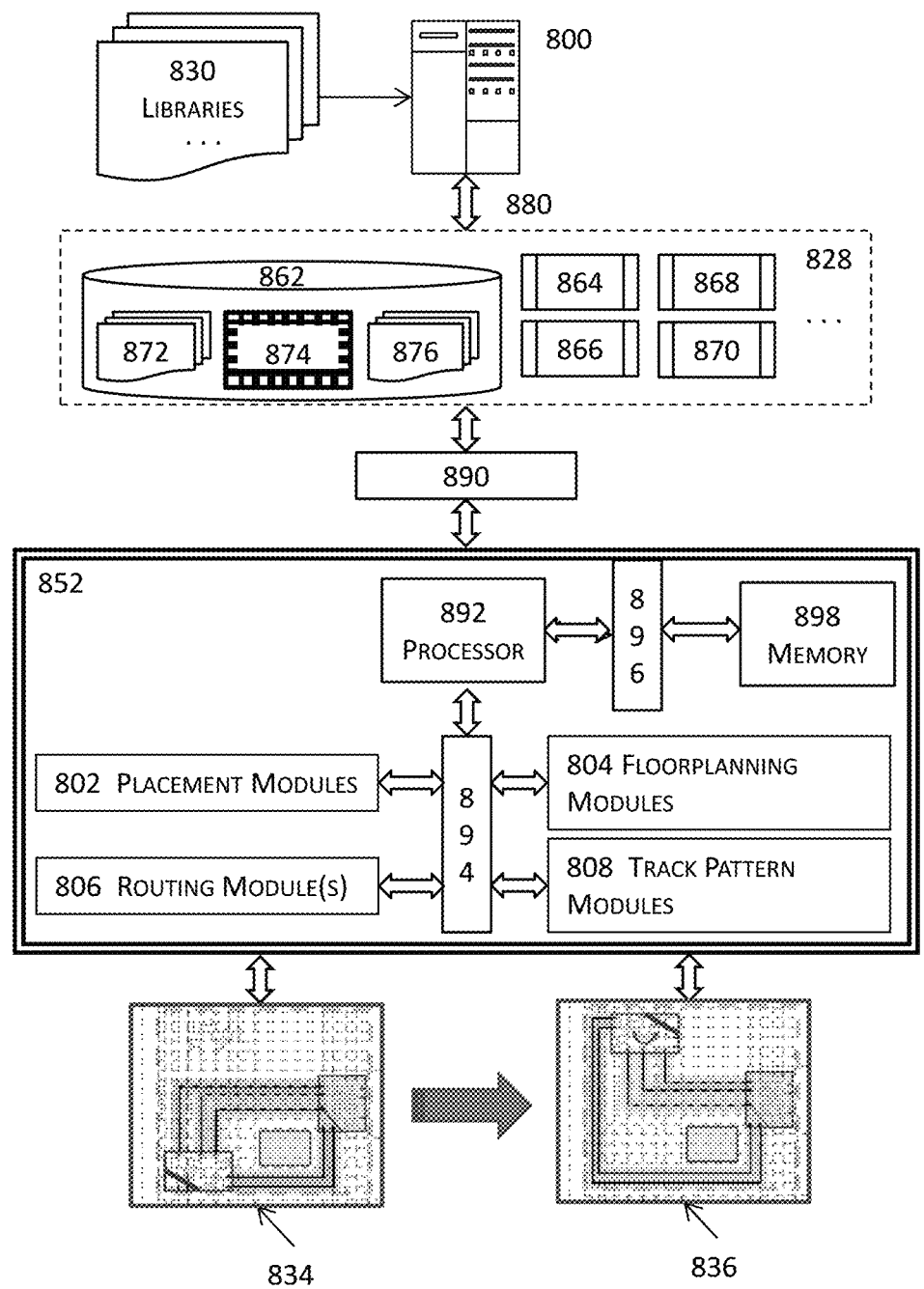
FIG. 8A illustrates a block diagram of a system for implementing routing aware placement for an electronic design in one or more embodiments.

FIG. 8A illustrates a block diagram of a system for implementing routing aware placement for an electronic design in one or more embodiments. More specifically, FIG. 8A illustrates an illustrative high level schematic block diagrams for a system for implementing routing aware placement for an electronic design and may comprise one or more computing systems 800, such as a general purpose computer described in the System Architecture Overview section configured to perform unique functions described herein to achieve one or more special, intended proposes.

The illustrative system in FIG. 8A may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 8A may be located in a cloud computing platform in some embodiments.

The one or more computing systems 800 receive the schematics 830 of an electronic design and invoke various modules (e.g., an automatic floorplanner, an interactive placement module, etc.) to generate a floorplan or a placement layout (e.g., 834 and 836) that may be further processed by a routing engine to generate a routed layout 838. This routed layout 838 may also be optionally processed with various post-route modules to generate a fabrication worthy layout from which a set of mask designs can also be generated to ready the electronic design for tapeout.

In some embodiments, the one or more computing systems 800 may invoke various system resources such as the processor(s) or processor core(s), memory, disks, etc. The one or more computing systems 800 may also initiate or interact with other computing systems to access, via a computer bus architecture (e.g., a system bus, a control bus, a data bus, or any combinations thereof), various resources 828 that may comprise a floorplanner, a global routing engine, and/or a detail routing engine 864, a layout editor 866, a design rule checker 868, a verification engine 870, etc.

The one or more computing systems 800 may further write to and read from a local or remote non-transitory computer accessible storage 862 that stores thereupon data or information such as, but not limited to, one or more databases (874) such as schematic design database(s) or physical design database(s), electronic circuit design specification database(s), various statistics, various data, rule decks, various design rules, constraints, etc. (872), or other information or data (876) that may be used to facilitate the performance of various functions to achieve the intended purposes.

In some embodiments, the one or more computing systems 800 may include or, either directly or indirectly through the various resources 828, invoke a set of modules 852 including hardware modules and software modules or combinations of one or more hardware modules and one or more software modules that may comprise routing-aware placement modules 802 (e.g., interactive placement module, assisted placement module, automatic placement module, etc.) that are made aware of various routing requirements, design rules, constraints, etc. and interact with a designer in implementing a placement layout.

For example, a designer may manually define a region and manually drag an instance to a desired location in the manually defined region in a placement layout or floorplan, and an interactive placement module 802 may determine one or more legal positions in one or more rows in a row region based on where the design drags the instance in order to insert the instance to create a legal placement layout or floorplan using the techniques described herein.

The set of modules 852 may also include routing-aware floorplanning modules 804 that assist a designer in placing one or more blocks, cells, macros, and/or instances in a floorplan. For example, a designer may specify a set of blocks to be placed in a region in a floorplan. An assisted floorplanning module 804 may identify this set of blocks and their respective characteristics, identify one or more row templates, track patterns, and/or requirements, apply the one or more row templates or track patterns to the region, and determine one or more viable floorplanning options for the set blocks.

The set of modules 852 may also include a routing module 806 that receives the floorplan from a floorplanner 804 or a placement layout from a placement module 802 and performs routing (e.g., global routing, channel routing, conduit routing, detailed routing, etc.) to interconnect devices in the received floorplan or placement layout. The set of modules 852 may also include track pattern modules 808 to perform various actions for or on track patterns or routing tracks. This set of modules 852 may jointly perform all floorplanning tasks and placement tasks with routing awareness to implement a floorplan or a placement layout while generating geometric routes dynamically or on the fly.

The set of modules 852 may also include various post-route modules (not shown) to perform various post-route operations. These post-route modules may include, for example, one or more verification modules to perform various behavior, functional, and/or formal verification tasks, one or more post-route optimization modules to perform various optimization tasks on the routed layout, and/or one or more signoff modules (not shown) to perform various signoff and design closure tasks.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level or better accuracy to ensure an electronic design meets or exceeds power, performance, and/or area goals in some embodiments.

In some embodiments, the computing system 800 may include the various resources 828 such that these various resources may be invoked from within the computing system via a computer bus 880 (e.g., a data bus interfacing a microprocessor 892 and the non-transitory computer accessible storage medium 898 or a system bus 890 between a microprocessor 892 and one or more engines in the various resources 828). In some other embodiments, some or all of these various resources may be located remotely from the computing system 800 such that the computing system may access the some or all of these resources via a computer bus 880 and one or more network components.

The computing system may also include one or more modules in the set of modules 852. One or more modules in the set 852 may include or at least function in tandem with a microprocessor 892 via a computer bus 894 in some embodiments. In these embodiments, a single microprocessor 892 may be included in and thus shared among more than one module even when the computing system 800 includes only one microprocessor 892. A microprocessor 892 may further access some non-transitory memory 898 (e.g., random access memory or RAM) via a system bus 896 to read and/or write data during the microprocessor's execution of processes.

System Architecture Overview

Figure 8B:
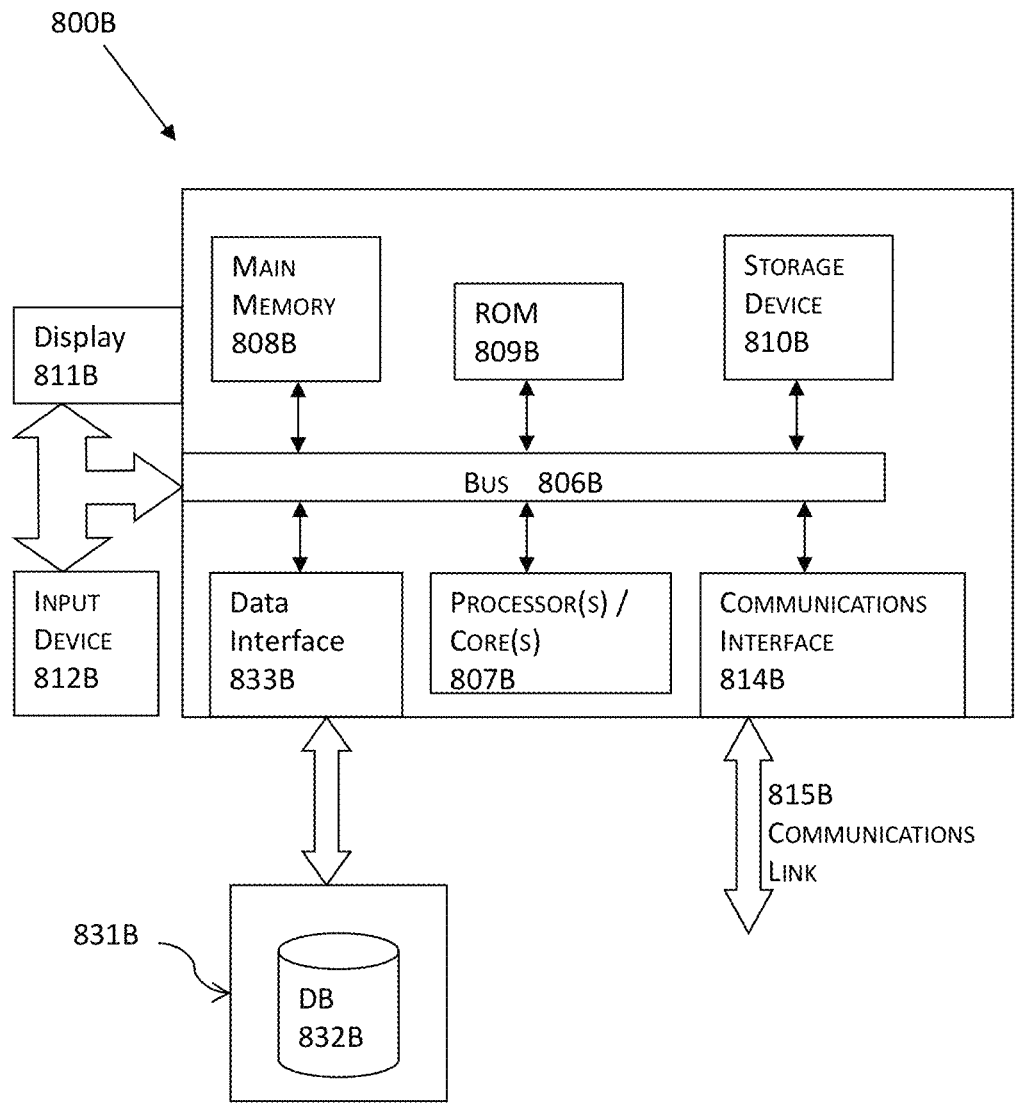
FIG. 8B illustrates a computerized system on which a method for implementing routing aware placement for an electronic design may be implemented.

FIG. 8B illustrates a computerized system on which a method for implementing routing aware placement for an electronic design may be implemented as described in the preceding paragraphs with reference to various figures. The illustrative computing system 800B may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 800B may include or may be a part of a cloud computing platform in some embodiments. Computer system 800B includes a bus 806B or other communication module for communicating information, which interconnects subsystems and devices, such as processor 807B, system memory 808B (e.g., RAM), static storage device 809B (e.g., ROM), disk drive 810B (e.g., magnetic or optical), communication interface 814B (e.g., modem or Ethernet card), display 811B (e.g., CRT or LCD), input device 812B (e.g., keyboard), and cursor control (not shown).

According to one embodiment, computing system 800B performs specific operations by one or more processor or processor cores 807B executing one or more sequences of one or more instructions contained in system memory 808B. Such instructions may be read into system memory 808B from another computer readable/usable storage medium, such as static storage device 809B or disk drive 810B. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 807B, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A modules described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs.

The term "computer readable storage medium" or "computer usable storage medium" as used herein refers to any non-transitory medium that participates in providing instructions to processor 807B for execution. Such a medium may take many forms, including but not limited to, non-volatile media and volatile media. Non-volatile media includes, for example, optical or magnetic disks, such as disk drive 810B. Volatile media includes dynamic memory, such as system memory 808B. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800B. According to other embodiments of the invention, two or more computer systems 800B coupled by communication link 815B (e.g., LAN, PTSN, or wireless network) may perform the sequence of instructions required to practice the invention in coordination with one another.

Computer system 800B may transmit and receive messages, data, and instructions, including program, i.e., application code, through communication link 815B and communication interface 814B. Received program code may be executed by processor 807B as it is received, and/or stored in disk drive 810B, or other non-volatile storage for later execution. In an embodiment, the computing system 800B operates in conjunction with a data storage system 831B, e.g., a data storage system 831B that includes a database 832B that is readily accessible by the computing system 800B. The computing system 800B communicates with the data storage system 831B through a data interface 833B. A data interface 833B, which is coupled with the bus 806B, transmits and receives electrical, electromagnetic or optical signals that include data streams representing various types of signal information, e.g., instructions, messages and data. In embodiments of the invention, the functions of the data interface 833B may be performed by the communication interface 814B.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing routing aware floorplanning or placement for an electronic design, comprising:
    preprocessing an electronic design and a plurality of inputs for a floorplanning or placement engine that is stored at least partially in memory and functions in tandem with at least one microprocessor;
    identifying, at the floorplanning or placement engine, a tentative location for inserting a block comprising one or more pins into a floorplan or placement layout; and
    prior to entering a routing stage, imparting routing information to a process that generates the floorplan or the placement layout at least by:
        generating a switchbox for the block;
        snapping the block to a legal location based at least in part upon one or more characteristics of the one or more pins or one or more pseudo-pins; and
        updating the floorplan or placement layout within a context of one or more geometric routes during insertion of the block into the floorplan or placement layout, based in part or in whole upon the switchbox and the legal location.

2. The computer implemented method of claim 1, further comprising:
    identifying a region from the floorplan or placement layout; and
    identifying one or more existing electronic design components in the region.

3. The computer implemented method of claim 2, further comprising:
    identifying one or more blockages in the region;
    identifying a set of design rules, constraints, or requirements governing permissible arrangements of electronic circuit design components; and
    identifying a bias for tiling the region for the block.

4. The computer implemented method of claim 3, further comprising:
    determining one or more spacetiles in the region based in part or in whole upon the input data, the one or more blockages, the bias, or the set of design rules, constraints, or requirements.

5. The computer implemented method of claim 4, further comprising:
    identifying the region from the floorplan or the placement layout;
    identifying boundaries of the one or more existing electronic design components or the one or more blockages in the region; and
    identifying the set of design rules, constraints, or requirements governing the permissible arrangements of electronic design components.

6. The computer implemented method of claim 5, further comprising:
    augmenting the boundaries of the one or more existing electronic design components or the one or more blockages in the region into augmented boundaries based at least in part upon a part of the set of design rules, constraints, or requirements.

7. The computer implemented method of claim 5, further comprising:
    determining a free design space in the region based in part or in whole upon the boundaries or the augmented boundaries of the one or more existing electronic design components or the one or more blockages; and
    determining the one or more spacetiles for the free design space based in part or in whole upon the boundaries or augmented boundaries of the boundaries.

8. The computer implemented method of claim 1, further comprising:
    identifying one or more tentative locations for inserting the block into the floorplan or the placement layout;
    identifying a pattern or trajectory of movement of a cursor of a pointing device that is used to manipulate the block in the floorplan or the placement layout;
    identifying a cursor sampling rate, a speed of the cursor, or an acceleration of the cursor; and
    identifying one or more cursor locations as the one or more tentative locations based at least in part upon the pattern or the trajectory, the cursor sampling rate, the speed of the cursor, or the acceleration of the cursor.

9. The computer implemented method of claim 1, further comprising:
- identifying a set of design rules, requirements, or constraints governing routing tracks or track patterns for the one or more pins of the block;
- identifying a set of routing tracks or one or more track patterns that satisfy the set of design rules, requirements, or constraints;
- determining one or more legal locations for the block based in part or in whole upon the set of routing tracks or the one or more track patterns; and
- identifying a final legal location from the one or more legal locations.

10. The computer implemented method of claim 1, further comprising:
- identifying a source pin and a destination pin that are to be interconnected in the floorplan or the placement layout;
- determining a transition pattern for interconnecting the source pin and the destination pin based at least in part upon a set of legal track patterns;
- interconnecting the source pin and the destination pin with an interconnect having one or more bends or vias by using at least the transition pattern; and
- compacting at least some interconnect segments in the floorplan or the placement layout.

11. The computer implemented method of claim 1, further comprising:
- performing incremental modifications on the floorplan or the placement layout.

12. The computer implemented method of claim 11, further comprising:
- tiling a region in the floorplan or the placement layout based in part or in whole upon movement of the block in the floorplan or the placement layout;
- identifying one or more previous sets of physical implementation solutions at one or more legal locations for the block; and
- storing at least a part of the one or more previous sets of physical implementation solutions in a non-transitory computer readable medium.

13. The computer implemented method of claim 12, further comprising:
- identifying a new legal location for the block based at least in part upon a current tentative location of a cursor of a pointing device used to manipulate the block in the floorplan or the placement layout;
- identifying a range of influence; and
- determining whether to regenerate geometric routes for the block at the new legal location or to modify the one or more geometric routes for the block.

14. The computer implemented method of claim 13, further comprising:
- invoking a routing engine to regenerate the geometric routes when it is determined to regenerate the geometric routes for the block;
- constructing a localized switchbox problem for modifying the one or more geometric routes when it is determined to modify the one or more geometric routes into one or more modified geometric routes for the block; and
- graphically representing the geometric routes or the one or more modified geometric routes in a graphical user interface.

15. A system for implementing routing aware floorplanning or placement for an electronic design, comprising:
- a plurality of modules, at least one of which comprises at least one microprocessor including one or more processor cores executing one or more threads in a computing system;
- a non-transitory computer accessible storage medium storing thereupon program code that includes a sequence of instructions that, when executed by the plurality of modules, causes the plurality of modules at least to:
- preprocess an electronic design and a plurality of inputs for a floorplanning or placement engine that is stored at least partially in memory and functions in tandem with at least one microprocessor;
- identify, at the floorplanning or placement engine, a tentative location for inserting a block comprising one or more pins into a floorplan or placement layout;
- prior to entering a routing stage, imparting routing information to a process that generates the floorplan or the placement layout at least by:
  - generating a switchbox for the block;
  - snap the block to a legal location based at least in part upon one or more characteristics of the one or more pins or one or more pseudo-pins; and
  - update the floorplan or placement layout with one or more geometric routes during insertion of the block into the floorplan or placement layout, based in part or in whole upon the switchbox and the legal location.

16. The system of claim 15, wherein the program code includes further instructions that, when executed by the plurality of modules, cause the plurality of modules to:
- identify a region from the floorplan or placement layout;
- identify one or more existing electronic design components in the region;
- identify one or more blockages in the region;
- identify a set of design rules, constraints, or requirements governing permissible arrangements of electronic circuit design components;
- identify a bias for tiling the region for the block; and
- determine one or more spacetiles in the region based in part or in whole upon the input data, the one or more blockages, the bias, or the set of design rules, constraints, or requirements.

17. The system of claim 16, wherein the program code includes further instructions that, when executed by the plurality of modules, cause the plurality of modules to:
- identify the region from the floorplan or the placement layout;
- identify boundaries of the one or more existing electronic design components or the one or more blockages in the region;
- identify the set of design rules, constraints, or requirements governing the permissible arrangements of electronic design components;
- augment the boundaries of the one or more existing electronic design components or the one or more blockages in the region into augmented boundaries based at least in part upon a part of the set of design rules, constraints, or requirements;
- determine a free design space in the region based in part or in whole upon the boundaries or the augmented boundaries of the one or more existing electronic design components or the one or more blockages; and
- determine the one or more spacetiles for the free design space based in part or in whole upon the boundaries or augmented boundaries of the boundaries.

18. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing routing aware floorplanning or placement for an electronic design, the set of acts comprising:

preprocessing an electronic design and a plurality of inputs for a floorplanning or placement engine that is stored at least partially in memory and functions in tandem with at least one microprocessor;

identifying, at the floorplanning or placement engine, a tentative location for inserting a block comprising one or more pins into a floorplan or placement layout; and prior to entering a routing stage, imparting routing information to a process that generates the floorplan or the placement layout at least by:

generating a switchbox for the block;

snapping the block to a legal location based at least in part upon one or more characteristics of the one or more pins or one or more pseudo-pins; and updating the floorplan or placement layout with one or more geometric routes during insertion of the block into the floorplan or placement layout, based in part or in whole upon the switchbox and the legal location.

19. The article of manufacture of claim 18, the set of acts further comprising:

identifying one or more tentative locations for inserting the block into the floorplan or the placement layout;

identifying a pattern or trajectory of movement of a cursor of a pointing device that is used to manipulate the block in the floorplan or the placement layout;

identifying a cursor sampling rate, a speed of the cursor, or an acceleration of the cursor;

identifying one or more cursor locations as the one or more tentative locations based at least in part upon the pattern or the trajectory, the cursor sampling rate, the speed of the cursor, or the acceleration of the cursor;

identifying a set of design rules, requirements, or constraints governing routing tracks or track patterns for the one or more pins of the block;

identifying a set of routing tracks or one or more track patterns that satisfy the set of design rules, requirements, or constraints;

determining one or more legal locations for the block based in part or in whole upon the set of routing tracks or the one or more track patterns; and identifying a final legal location from the one or more legal locations.

20. The article of manufacture of claim 18, the set of acts further comprising:

identifying a source pin and a destination pin that are to be interconnected in the floorplan or the placement layout;

determining a transition pattern for interconnecting the source pin and the destination pin based at least in part upon a set of legal track patterns;

interconnecting the source pin and the destination pin with an interconnect having one or more bends or vias by using at least the transition pattern;

compacting at least some interconnect segments in the floorplan or the placement layout;

performing incremental modifications on the floorplan or the placement layout;

tiling a region in the floorplan or the placement layout based in part or in whole upon movement of the block in the floorplan or the placement layout;

identifying one or more previous sets of physical implementation solutions at one or more legal locations for the block;

storing at least a part of the one or more previous sets of physical implementation solutions in a non-transitory computer readable medium;

identifying a new legal location for the block based at least in part upon a current tentative location of a cursor of a pointing device used to manipulate the block in the floorplan or the placement layout;

identifying a range of influence;

determining whether to regenerate geometric routes for the block at the new legal location or to modify the one or more geometric routes for the block;

invoking a routing engine to regenerate the geometric routes when it is determined to regenerate the geometric routes for the block;

constructing a localized switchbox problem for modifying the one or more geometric routes when it is determined to modify the one or more geometric routes into one or more modified geometric routes for the block; and graphically representing the geometric routes or the one or more modified geometric routes in a graphical user interface.

* * * * *